United States Patent
Esaka et al.

(10) Patent No.: US 8,862,558 B2
(45) Date of Patent: Oct. 14, 2014

(54) SINGLE INSTANTIATION METHOD USING FILE CLONE AND FILE STORAGE SYSTEM UTILIZING THE SAME

(75) Inventors: Tomonori Esaka, Yokohama (JP); Takaki Nakamura, Ebina (JP); Hitoshi Kamei, Sagamihara (JP); Masakuni Agetsuma, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/387,614

(22) PCT Filed: Jan. 25, 2012

(86) PCT No.: PCT/JP2012/000464
§ 371 (c)(1),
(2), (4) Date: Jan. 27, 2012

(87) PCT Pub. No.: WO2013/111187
PCT Pub. Date: Aug. 1, 2013

(65) Prior Publication Data
US 2013/0191350 A1    Jul. 25, 2013

(51) Int. Cl.
*G06F 17/30* (2006.01)
(52) U.S. Cl.
CPC .................. *G06F 17/30156* (2013.01)
USPC .......................................................... 707/692
(58) Field of Classification Search
CPC ................................................ G06F 17/30067
USPC .......................................................... 707/692
See application file for complete search history.

(56) References Cited

U.S. PATENT DOCUMENTS 5,732,265 A * 3/1998 Dewitt et al. ................. 1/1
6,477,544 B1  11/2002 Bolosky et al.
(Continued)

FOREIGN PATENT DOCUMENTS

EP      1533716 A1    5/2005

OTHER PUBLICATIONS

International Business Machines Corporation: "Network attached storage with plug-and-play interface for direct storage attachment", Research Disclosure, Mason Publications, Hampshire, GB, vol. 466, No. 113, Feb. 1, 2003, XP007132277, ISSN: 0374-4353.

(Continued)

*Primary Examiner* — Soheila Davanlou
(74) *Attorney, Agent, or Firm* — Mattingly & Malur, PC

(57) ABSTRACT

In file de-duplication using hash value comparison, hash values of all target files must be calculated and actual data of all files must be read for hash value calculation, so that the processing time was long. The present invention provides a file storage system comprising a controller and a volume storing a plurality of files, the volume including a first directory storing a first file and a second file and a second directory storing a third file being created, wherein the controller migrates actual data of the second file to the third file, sets up a management information of the second file so that the third file is referred to when the second file is read, and if the sizes of actual data of the first file and the actual data of the third file are identical and the binaries of the actual data of the first file and the actual data of the third file are identical, sets up a management information of the first file to refer to the third file when reading the first file.

13 Claims, 17 Drawing Sheets

(56) References Cited

U.S. PATENT DOCUMENTS

| | | | |
|---|---|---|---|
| 2007/0192551 A1* | 8/2007 | Hara et al. | 711/162 |
| 2008/0016132 A1* | 1/2008 | Merhar | 707/206 |
| 2008/0065667 A1* | 3/2008 | Hopkins | 707/101 |
| 2008/0154914 A1* | 6/2008 | Kan et al. | 707/10 |
| 2010/0094813 A1 | 4/2010 | Brueggemann et al. | |
| 2010/0205370 A1* | 8/2010 | Ikawa et al. | 711/114 |
| 2012/0059797 A1* | 3/2012 | Prahlad et al. | 707/652 |

OTHER PUBLICATIONS

International Search Report on international application No. PCT/JP20121000464, mailed on Sep. 6, 2012.

* cited by examiner

SINGLE INSTANTIATION METHOD USING FILE CLONE AND FILE STORAGE SYSTEM UTILIZING THE SAME

TECHNICAL FIELD

The present invention relates to a file storage system and a management method thereof.

BACKGROUND ART

NAS (Network Attached Storage) is a storage device suitable for sharing a file data among a plurality of computers via a network. Currently, many file data storages utilize NAS devices.

The amount of data stored in high performance primary file servers are increasing rapidly. Along therewith, the number of disks coupled to a file server and the sizes thereof are increasing, and the costs related to purchasing and maintaining the disks are also increasing. In order to reduce the costs spent on disks, an art related to de-duplication for reducing the amount of data stored in a primary file server is attracting attention. The art of de-duplication can be classified into a block level de-duplication in which de-duplication is performed in block units and a file level de-duplication in which de-duplication is performed in file units, wherein the file level de-duplication technique is specifically referred to as a single instantiation technique.

Single instantiation relates to an art of reducing the physical data capacity by unifying the data of a group of files in which the whole file data are consistent to one file. Single instantiation applies only a small load on the system compared to the block level de-duplication technique since the processing is performed for each file, so that it is easily applied to a primary file server. A general method for realizing single instantiation is disclosed in patent literature 1. Duplication of files capable of being subjected to single instantiation is generally determined by calculating a hash value of files, comparing the hash values, and further subjecting the files having the identical hash values to binary comparison.

Further, since files having greater sizes should be subjected to single instantiation to exert a greater data space reduction effect, patent literature 1 further discloses an art of performing determination for single instantiation by restricting the target files for duplication determination to those having a certain size or greater.

CITATION LIST

Patent Literature

PTL 1: Publication of U.S. Pat. No. 6,477,544

SUMMARY OF INVENTION

Technical Problem

In any prior art method, whether to perform duplication is determined via hash value comparison, and in order to detect file duplication via hash value comparison, the hash values of all target files must be calculated, and in order to perform hash value comparison, all the actual data of the files must be read. That is, even non-duplicated files must have the actual data of the files read for detecting file duplication, so that it takes much time to detect corresponding files from an enormous number of file groups and perform single instantiation thereto. Further, the process overhead of hash value calculation may become a cause of deterioration of performance of the file server.

Solution to Problem

The present inventors have confirmed a finding in that regarding files having large file sizes, there is a high probability that the files having identical file sizes also have matching results via binary comparison. As described earlier, the files having larger sizes exert greater effect of single instantiation, and therefore, the larger files tend to be the comparison target for duplication, so that the present inventors have concluded that the comparison of file sizes is effective for detecting duplicated files. Therefore, in order to solve the problems of the prior art, the present invention first performs file size comparison to detect file duplication, and performs binary comparison of files having corresponding file sizes.

In detail, the present invention provides a file storage system comprising a controller for managing a plurality of files each having management information and actual data, a storage medium constituting a volume for storing a plurality of files, wherein the volume includes a first directory and a second directory, the first directory storing a first file and a second file, wherein the controller creates a third file in the second directory and migrates actual data of the second file to the third file, sets up the management information of the second file to refer to the third file when the second file receives a read access from the computer, compares a size of the actual data of the first file with the actual data of the third file, if as a result of the size comparison the data size is identical, compares the binary of the actual data of the first file with the actual data of the third file, and if as a result of the binary comparison the binary is identical, sets up the management information of the first file to refer to the third file when the first file receives a read access from the computer, and deletes the first actual data.

According to one aspect of the present invention, when a write request to the first file is received, the controller stores an update data in the first file, wherein when a read request to a first file that is not an updated data is received, reads the actual data of the third file by referring to the third file, and when a read request to the first file regarding the update data is received, reads the update data stored in the first file.

According to another aspect of the present invention, upon migrating actual data of the second file to the third file, the controller sets up the management information of the third file so that an actual data storage area of the second file is shown as a storage area storing actual data of the third file, and deletes the management information of the second file showing the actual data storage area of the second file.

According to another aspect of the present invention, the second directory is an index directory, a third directory is provided in which a size of a file stored in the second directory is set as a directory name, the third file is created in the third directory in which the size of the third file is set as the directory name, and in order to compare the size of the actual data of the third file with the actual data of the first file, the controller compares the size with a size denoted in the third directory name instead of the size of the actual data of the third file.

According to another aspect of the present invention, when the data sizes differ as a result of size comparison, the controller creates a fourth directory in which the size of the first file is set as the directory name to the second directory, creates a fourth file in the fourth directory, migrates the actual data of the first file to the fourth file, and sets up the management information of the first file to refer to the fourth file when the first file receives a read access from the computer.

According to yet another aspect of the present invention, when the binaries differ as a result of binary comparison, the controller creates a fourth file in the third directory, migrates the actual data of the first file to the fourth file, and sets up the management information of the first file to refer to the fourth file when the first file receives a read access from the computer.

According to another aspect of the present invention, during binary comparison, the controller computes a hash value of the first file and the third file, changes a name of the third file to contain the hash value of the third file, and creates the fourth file to have a name including the hash value of the first file.

According to yet another aspect of the present invention, if the data sizes are identical as a result of the size comparison, the controller examines whether a number of files stored in the third directory exceeds a threshold value, and if the number of files stored in the third directory exceeds the threshold value as a result of the examination, compares hash values of the files stored in the third directory and the first file, and performs binary comparison with the first file for the file having the identical hash value with the first file as a result of the hash value comparison. In addition, the hash value comparison is performed by comparing the calculated hash value of the first file with the hash value contained in the file name stored in the third directory.

According to another aspect of the present invention, the controller counts a reference number of the third file being referred to from the plurality of files stored in the first directory, deletes the third file when the reference number of files referring to the third file becomes zero, and deletes the third directory when there are no more files in the third directory as a result of deleting the third file.

According to another aspect of the present invention, the controller observes a ratio of the update data stored in the first file with respect to the actual data stored in the third file, and when the observed ratio exceeds a threshold value, copies portions excluding the update data of the actual data stored in the third file from the third file to the first file, and deletes a message to refer to the third file from the management information of the first file.

Further according to an aspect of the present invention, the file size comparison of the files stored in the first directory is performed in order from the file having the largest data. In addition, the second directory is a hidden directory.

Further aspects of the present invention will become apparent from the following descriptions, or can be learned from the present embodiments. The embodiments of the present invention will be achieved and realized by elements or various combination of elements, detailed descriptions of the present specification and the claims of the invention.

Advantageous Effects of Invention

The present invention enables to realize high speed single instantiation without having to perform hash value calculation of all the files.

DESCRIPTION OF EMBODIMENTS

Figure 1:
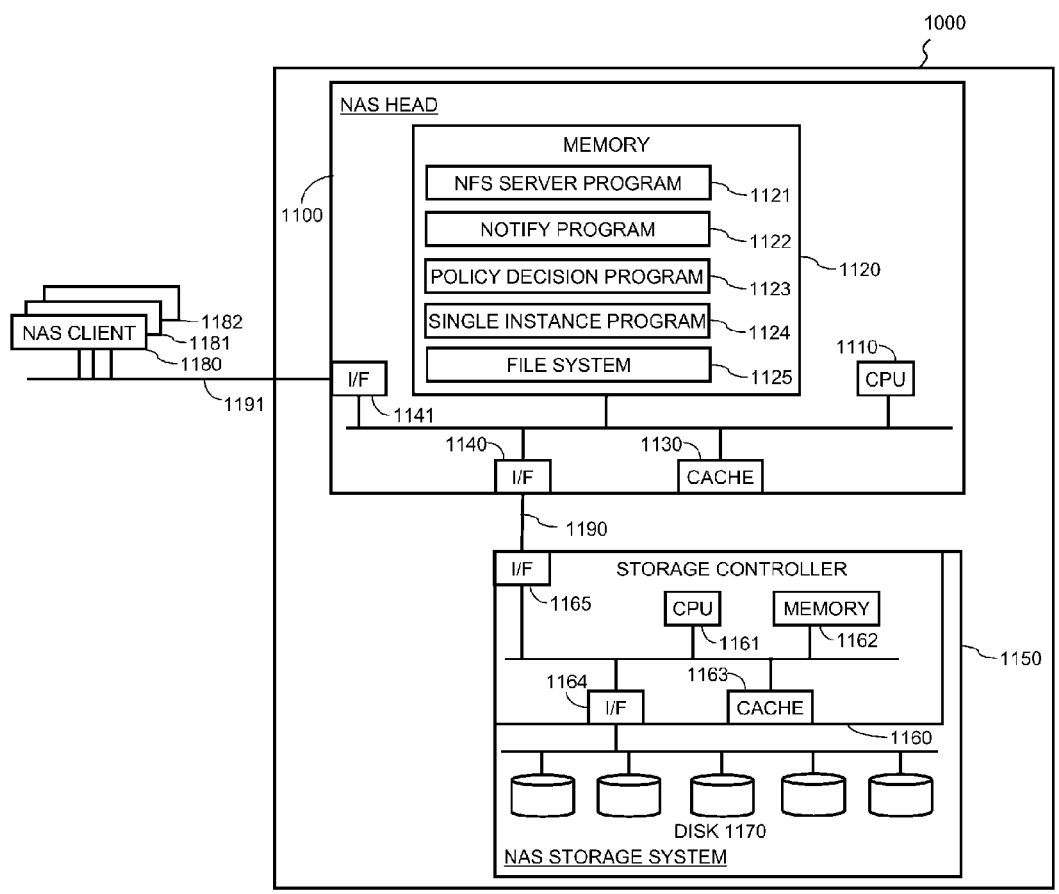
FIG. 1 is a block diagram illustrating a physical configuration of a typical system (information processing system) according to the present invention.

Now, the preferred embodiments of the present invention will be described with reference to the accompanying drawings. In the drawings, the elements having the same functions may be denoted with the same reference numbers. The drawings illustrate actual preferred embodiments in accordance with the principles of the present invention, but these embodiments are merely illustrated to facilitate better understanding of the invention, and they should not be used to restrict the scope of the invention in any way.

In addition, the preferred embodiments of the present invention can be implemented in a software operating in a general-purpose computer, in a dedicated hardware, or in a combination of software and hardware. In the drawings, the information according to the present invention is illustrated taking a table or a list as an example, but they are not restricted to information provided in the form of tables or lists, and the information can be in any form not dependent on the data structure.

According to the preferred embodiments of the present invention, a single instance function is realized in a NAS composed of a NAS head and a NAS storage system. However, the present invention is not restricted to the configuration composed of a NAS head and a NAS storage system, and can be realized in a server or the like having an internal disk disposed on the NAS head. The present invention is not restricted to the use of an NFS (Network File System) protocol, and can use other file sharing protocols such as a CIFS (Common Internet File System), an HTTP (Hypertext Transfer Protocol) and so on.

(1) First Embodiment

FIG. 1 is a view showing an outline of the physical configuration of a system according to a preferred embodiment of the present invention related to a computer system to which the first embodiment of the present invention is applied. A NAS device 1000 is composed of a NAS head 1100 and a NAS storage system 1150. The NAS head 1100 has a file sharing function, and is coupled via a network 1190 with a NAS storage system 1150 providing volumes for storing file data. The NAS head 1100 and the NAS storage system 1150 work together as a NAS device.

The NAS head 1100 and the NAS storage system 1150 are coupled via a network 1190. Further, the NAS device 1100 is coupled via a network 1191 to a plurality of NAS clients 1180 through 1182 that access the NAS device 1000. The network 1190 is a FC (Fiber Channel) and 1191 is a LAN (Local Area Network). Of course, the type of the network is not restricted to such networks, and various other networks can be utilized. Although not shown, the NAS clients 1180 through 1182 each include a CPU and a memory.

Figure 2:
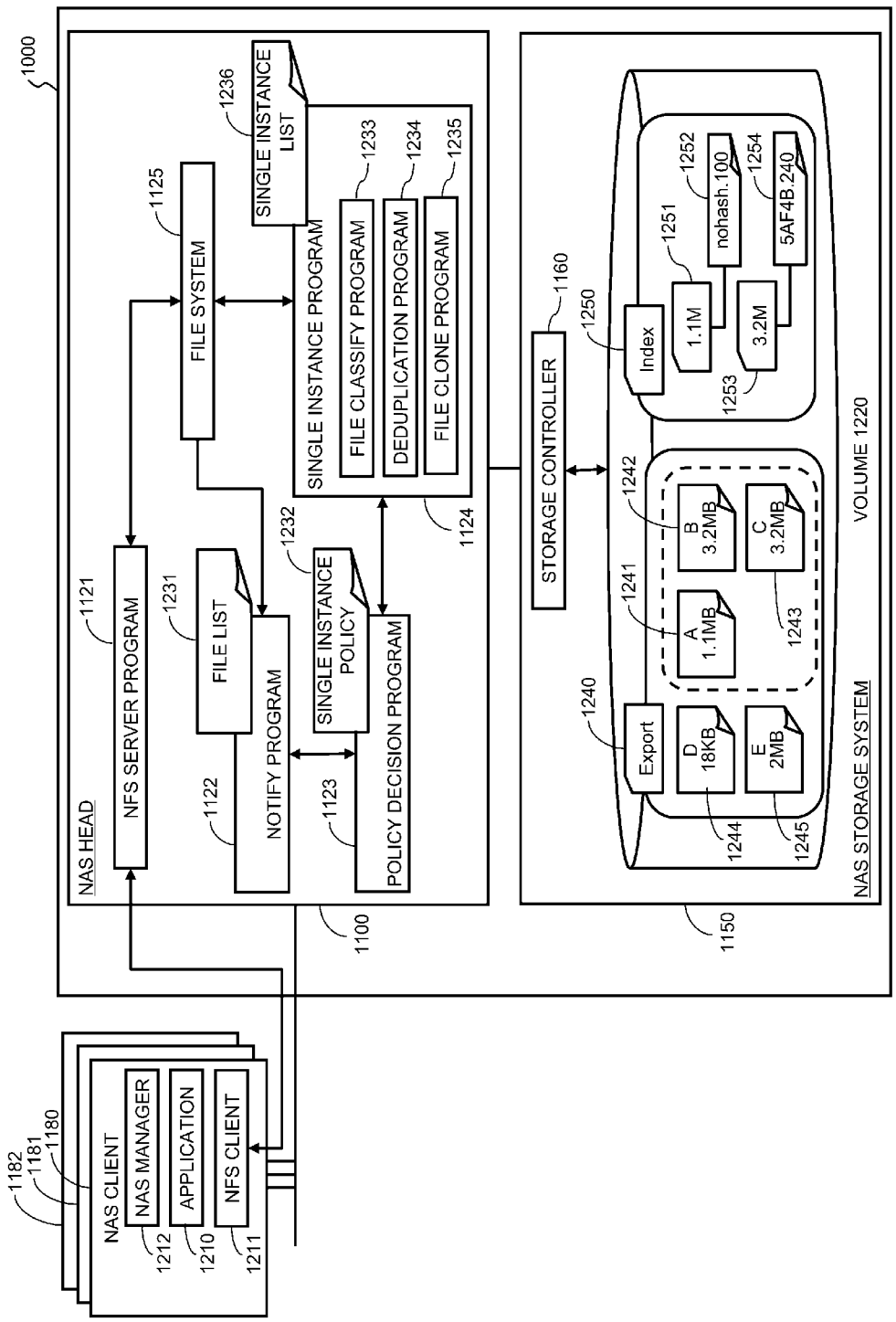
FIG. 2 is a view showing a more detailed physical and logical configuration of the information processing system according to the present invention.

The NAS storage system 1150 shown in FIG. 1 includes a CPU 1110, a memory 1120 and a cache 1130. Various programs as illustrated in FIG. 2 are stored in a memory 1120. Those programs are, for example, an NFS server program 1121, a notify program 1122, a policy decision program 1123, a single instance program 1124 and a file system 1125. Various driver software are also stored in the memory 1120. The various programs stored in the memory 1120 are read and executed by the CPU 1110 to realize functions such as the single instance function described in detail later. In the following description in which the program or the function is used as the subject, the processes are actually executed by the CPU or various circuits implementing the program.

A cache 1130 stores a write data received by the NAS head, a data read from a disk drive 1170, and so on. The NAS storage system 1150 includes a storage controller 1160 and a disk drive 1170. The storage controller 1160 includes a CPU 1161, a memory 1162 and a cache 1163.

As shown in FIG. 1, the NAS head 1100 and the NAS storage system 1150 have one or more interfaces (I/F) for coupling the NAS head and the NAS storage system to the network or to other devices. The NAS head 1100 includes I/F 1140 and 1141, and the storage controller 1160 includes I/F 1164 and 1165. Further, the NAS client also includes an I/F, although it is not shown in the drawing.

FIG. 2 is a view showing the outline of a logical configuration of the NAS device and the NAS client. Now, the files and applications implemented in the various elements of the NAS device 1000 will be described. The NAS client 1180 includes an application 1210, a NFS client 1211, and a NAS manager 1212 as programs operating therein. The NAS manager 1212 performs settings of the NAS device 1000.

The NAS storage system 1150 includes a volume 1220 for storing data provided via control of a storage controller 1160 and handled by the NAS head 1100, such as data files and various management files. The volume 1220 is realized using a storage area of the disk 1170 via the storage controller 1160.

The NFS server program 1121 is an application program for providing an NFS (Network File System) function for sharing files. The file system 1125 is a file system of the NAS head 1100 and stores files in a volume 1220. In the present embodiment, the file is composed of a block area storing an inode information, a block pointer and actual data. Inode information stores file configuration and mapping information of block pointers.

The file system can be, for example, an ext2 (second extended file system) or an ext3 (third extended file system) for Linux (Registered Trademark) or an NTFS (Windows NT (Registered Trademark) file system). The storage controller 1160 provides a storage function in block format such as an FC-SAN (Fiber Channel Storage Area Network). The file system 1125 stores data in a volume 1220 provided by the storage controller 1160.

A notify program 1122 cooperates with the file system 1125 and creates a file list 1231 which is a management file. The file list 1231 stores a list of file paths of files newly created or updated after a certain time (for example, previous single instance processing). For example, it is assumed that file paths of file A 1241, file B 1241 and file C 1243 are stored in the file list 1231 (files D 1244 and E 1245 are not stored). Initially, for example, the file system uses a find command or the like to create a file list 1231 storing the file paths of all the files in the file system.

The policy decision program 1123 includes a single instance policy 1232 which is a management file, and cooperates with the notify program 1122 and the single instance program 1124 to create a single instance list 1236 which is a management file. The single instance policy 1232 stores a policy for extracting a file from the file list 1231 to create a single instance list 1236.

For example, in order to perform single instantiation of only the files having a high space reduction effect by single instantiation, when a policy is stored in the single instance policy 1232 stating that the file size should be 1 MB or greater, a list of file paths of only the files having a file size of 1 MB or greater out of all the files stored in the file list 1231 is stored in the single instance list 1236. For example, file A 1241, file B 1242 and file C 1243 are stored in the list.

Other than the file size, it is possible to store a policy for performing single instantiation of only the files having an update frequency below a threshold, or to store a policy for performing single instantiation of only the files having a specific extension.

With respect to the files stored in the single instance list 1236, a single instance program 1124 has a function to detect duplication of the files and to perform single instantiation of the duplication files. The single instance program 1124 includes a file classify program 1233, a de-duplication program 1234, a file clone program 1235, and a single instance list 1236.

The file classify program 1233 performs classification of the files for determining duplication of the files finally via binary comparison. The file classify program 1233 performs primary detection of duplication files through comparison of file sizes. Further, when files are detected in which the files sizes are consistent, the deduplication program 1234 is started to perform binary comparison of the files.

In order to increase the speed of comparing the file sizes, an index directory 1250 is created in the volume 1220. The index directory 1250 that creates an actual size directory is a hidden directory, and stores information utilized by the single instance program 1124. By designing the directory as a hidden directly, it becomes possible to prevent the user from updating a clone parent file (which will be described in detail later).

However, the index directory 1250 does not necessarily have to be a hidden directory. Further, the index directory can include other directories such as an extension directory for storing a file extension information. An export directory 1240 stores files accessed by general users, and the files registered in the index directory 1250 are clone child files (which will be described in detail later).

What is meant by cloning of a file is that when there are a plurality of files storing identical contents, or if a file having an identical content is copied, one of the files storing the identical contents of the plurality of files is set as a clone parent file, and the other plurality of files storing the identical contents are set as clone child files. The file configuration of the inode information and the mapping information of the block pointers of the clone child files are changed, and when a clone child file is accessed, the file configuration of the inode information and the mapping information of the block pointers of the clone parent file are referred to. Then, the actual data of the clone child file is deleted. Thus, the clone child file is stubbed and only the clone parent file will have actual data, so that the required storage capacity can be reduced.

When a write access occurs to the clone child file, a physical block area is assigned to a logical block area to which the block pointer points, and data is stored in that physical block area. Further, the file configuration and the mapping information of the block pointer in the inode information of the clone child file are changed, and as for the read processing of the updated section, a block pointer of the clone child file is referred to and the data stored in the area that the block pointer points to is read. As for the access to the physical block area, the data in that area is referred to, and as for the access to other areas, the clone parent file is referred to.

Next, the flow of file cloning and the registration of files to an index directory 1250 according to the present embodiment will be described with reference to FIG. 3. In S17010, an actual size directory having a file size directory name of a register target file is created to a range size directory in which a file size of the register target file stored in an export directory 1240 is set as storage target out of the plurality of range size directories stored in the index directory.

In S17020, an empty file having a <nohash>.<inode number> as file name and having an identical size as the register target file is created in an actual size directory created in S17010. During initial registration of files to the index directory, the hash value information is not registered, so that the processing overhead by calculating the hash values of all files stored in the single instance list 1236 can be reduced and the speed of the processing can be enhanced. The file name can be any arbitrary character string defined to show that hash value calculation is not yet performed.

In S17030, the block pointer of the empty file created in S17020 is changed so as to refer to the actual data of the register target file. In S17040, the inode information of the registered file is changed to refer to the inode information of the file created in S17030. In S17050, the block pointer of the register target file is deleted.

According to the present processing, a clone child file which is a stub file referring to a parent file is created in an export directory 1240 and a clone parent file being referred to is created in the index directory. As a result, a clone parent file can be placed in the index directory which is a hidden directory, according to which update of the clone parent file by the user can be prevented and the load of changing the management information can be reduced. Further according to the present processing, data can be migrated from the register target file to the file created by the index directory, so that the load accompanying the migration processing can be reduced.

Returning now to FIG. 2, it is assumed that the file paths of file A 1241, file B 1242 and file C 1243 are stored in the single instance list 1236. A clone parent file of file A is registered as <nohash.100> file 1252 in the actual size directory 1251, and the file A 1241 in the export directory 1240 is converted to a clone child file. Further, similar to file A 1241, file B 1242 is registered in the actual size directory 1253, registered as a clone parent file 1254 in the index directory 1250, and file B 1242 in the export directory is converted to a clone child file.

The de-duplication program 1234 performs a de-duplication program processing A in which harsh value comparison is not performed and a de-duplication program processing B in which harsh value comparison is performed. In the following description, if there is no need to distinguish the two processes, the program is simply referred to as de-duplication program 1234. The de-duplication program 1234 performs binary comparison of files having identical file sizes. For example, binary comparison is performed for file B 1242 and file C 1243.

At this time, harsh value calculation is performed using the data read for binary comparison. This is in consideration of the drawback in that when a large number of files having identical file sizes but with different contents exist, the detection of duplication files by file size comparison requires a large number of times of binary comparison and takes too much. In order to solve this problem, if the number of files having identical file sizes but with different contents exceeds a certain threshold, hash value comparison is performed as a portion of the processing of the de-duplication program B.

The de-duplication program 1234 renames the file names of <nohash>.<inode number> to <hash value>.<inode number> using the computed hash value. As a result of binary comparison, when binary matching occurs, the file clone program 1235 converts the file in which file duplication has been detected, for example, file C 1243, to a clone child file.

According to the above process, single instantiation is performed for files B and C. As a result of binary comparison, when binary mismatching is determined, the files are registered to the index directory 1250. Since hash calculation is performed during binary comparison, the clone parent file is registered by the file name <hash value>.<inode number>. Further, the clone parent file has a reference counter for managing the number of clone child files referring thereto. The details of the delete processing of the clone parent file will be described later, but when a clone child file is deleted, the reference counter of the clone parent file is decremented, and when all the clone child files are deleted, the reference counter is set to zero so that the clone parent file becomes unnecessary and the clone parent file will be automatically deleted.

The NFS client 1211 includes an NFS client function that enables an application 1210 to access data within the data file of the NAS device 1000 via an NFS protocol, and accesses an NFS server program 1121 of the NAS head 1100. The NFS server program 1121 accesses a file system 1125 storing data in the volume 1220 of the NAS storage system 1150 coupled to the NAS head 1100 on behalf of the NFS client 1211.

Figure 4:
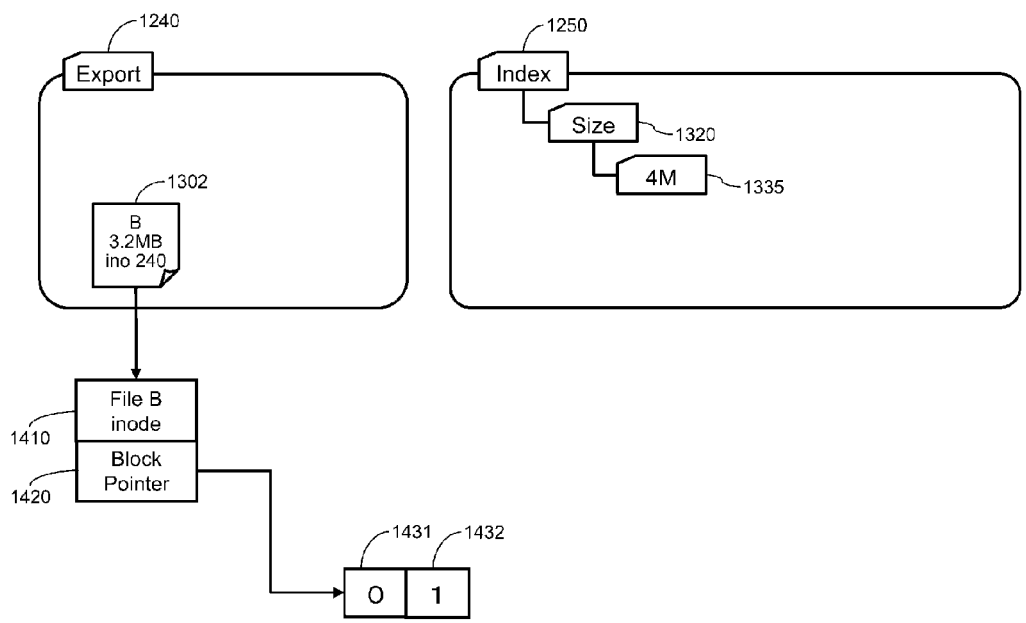
FIG. 4 is a view illustrating the relationship between the index directory and a file cloning technique according to the present invention.

Next, the actual flow of single instantiation using a file cloning function will be described with reference to FIGS. 4 through 9. FIG. 4 shows the state of file B 1302 prior to execution of the single instance program 1124. The export directory 1240 stores files accessed by the user. File B 1302 has a file size of 3.2 MB and an inode number of 240. File B 1302 is composed of an inode information 1410, a block pointer 1420 and block areas 1431 and 1432 storing actual data.

A size directory 1320 exists immediately below the index directory 1250, and although not shown in FIGS. 4 through 9, directories for storing information other than file size and hash value, such as an extension directory for storing the file extension information, can also be provided. As for the aforementioned range size directory, only a 4 M directory 1335 is shown in FIGS. 4 through 9, and other range size directories are omitted.

Figure 5:
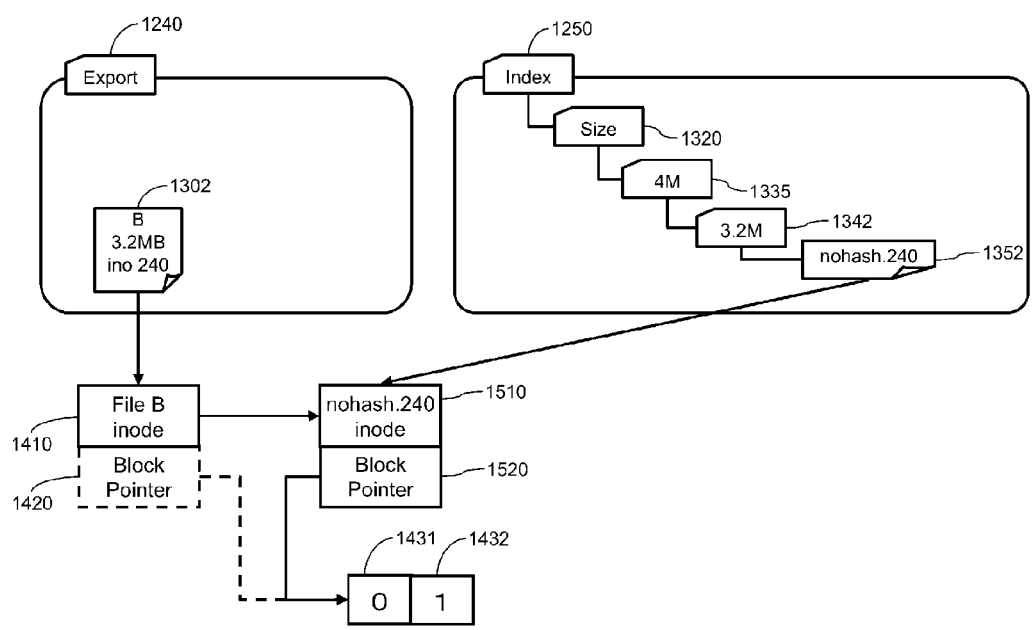
FIG. 5 is a view illustrating the operation of registration to the index directory using the file cloning technique according to the present invention.

FIG. 5 is a view showing a process in which a single instance program 1124 registers file B 1302 to an index directory 1250. In a 4 M directory 1335 which is a range size directory, a 3.2 M directory 1342 having a file size of file B 1302 as the directory name is created. Thereafter, an empty file having <nohash>.<inode number> as file name is created in the 3.2 M directory 1342. In the case of file B 1302, <nohash.240> becomes the file name Further, the file name can be any arbitrary character string defined to show that hash value calculation has not yet been performed.

The <nohash.240> file 1352 stores an inode information 1510 and a block pointer 1520, and the block pointer 1520 points to the same block areas 1431 and 1432 that the block pointer 1420 of file B 1302 points to. Then, the inode information 1410 of file B 1302 is changed, and when data access to file B 1302 occurs, the data in block areas 1431 and 1432 is referred to via the inode information 1510 of the <nohash.240> file 1352. Thereby, the data can be shifted from file B 1302 to <nohash.240> file 1352 without performing any copy processing. In this state, the <nohash.240> file 1352 is the clone parent file, the file B 1302 is the clone child file, wherein the clone parent file has the actual data and the clone child file refers to the actual data via the clone parent file.

Figure 6:
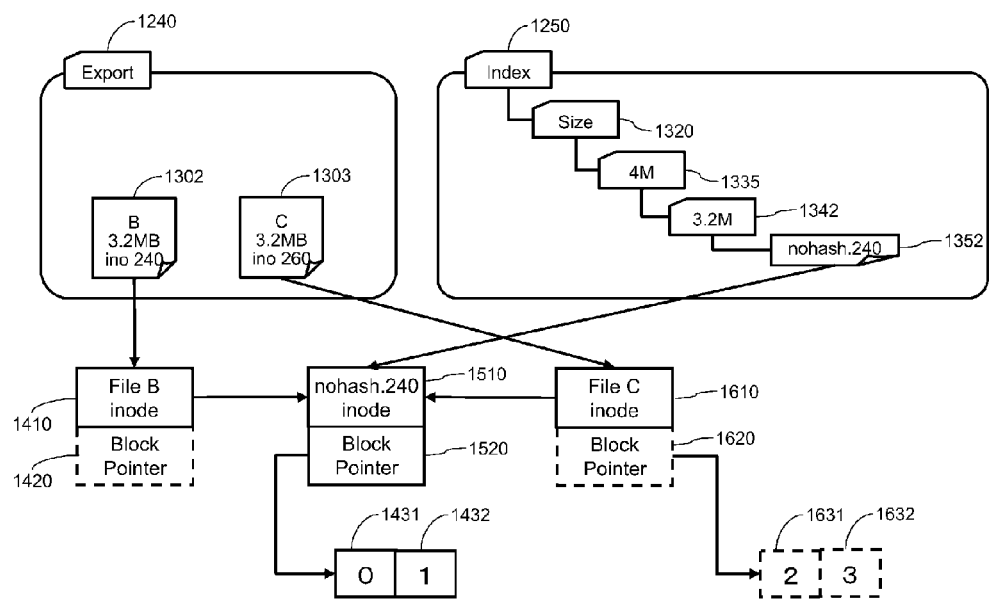
FIG. 6 is a view illustrating a single instantiation operation (1) using the file cloning technique according to the present invention.

FIG. 6 is a view showing a single instantiation processing of file B 1302 and file C 1303 storing identical contents. A file B 1302 converted to a clone child file and a normal file C 1303 exists in an export directory 1240. File C 1303 has a file size of 3.2 MB and an inode number of 260. File C 1303 is composed of an inode information 1610, a block pointer 1620, and block areas 1631 and 1632 storing actual data. Since file B 1302 and file C 1303 are identical files, the same data is stored in block areas 1431 and 1631 and the same data is stored in block areas 1432 and 1632.

The file size of file C 1303 is acquired, which is compared with the file size of <nohash.240> file 1352. As a result, the two files are found to have identical file sizes, so the two files are subjected to binary comparison. Actually, binary comparison of block areas 1431 and 1432 and block areas 1631 and 1632 is performed so as to confirm binary matching. Further, the disk-read data during binary comparison is used to calculate the hash value. Then, using the hash value, the file name of <nohash.240>file 1352 is renamed to <5AF4B.240>.

The inode information 1610 of file C 1303 is changed so that when data of file C 1303 is accessed, the block areas 1431 and 1432 are referred to via the inode information 1510 of the <5AF4B.240> file 1352. Thereafter, the data of block areas 1631 and 1632 of the pointer destination of a block pointer 1620 of the file C 1303 is deleted.

Figure 7:
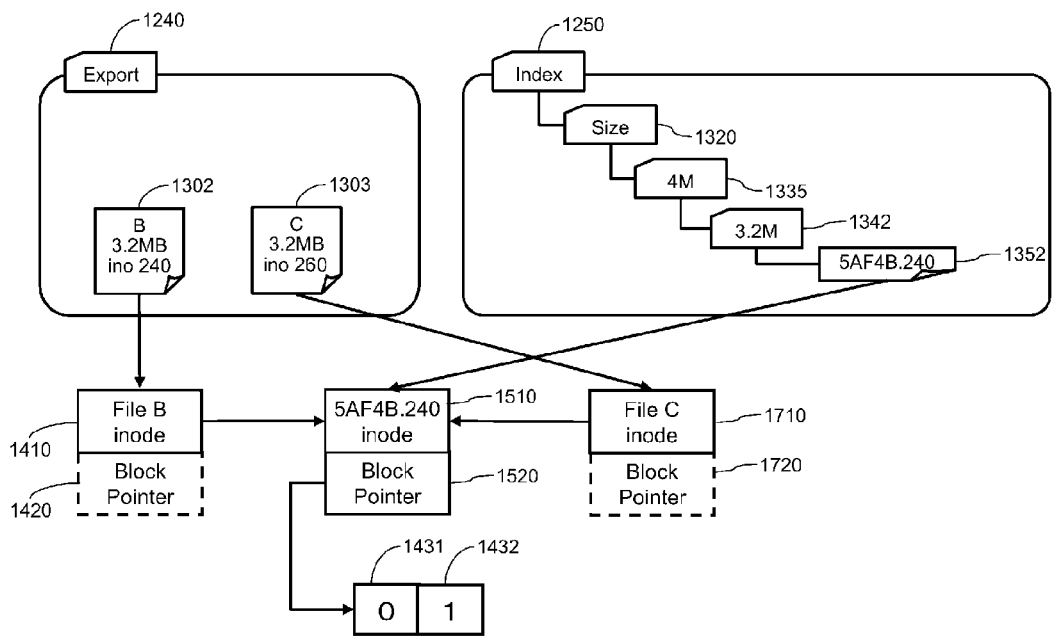
FIG. 7 is a view illustrating a single instantiation operation (2) using the file cloning technique according to the present invention.

FIG. 7 is a drawing showing the state after performing the single instantiation processing of file B 1302 and file C 1303. File C 1303 is converted to a clone child file having <5AF4B.240> file 1352 as the clone parent file (the inode information 1610 of file C is changed to inode information 1710, and the block pointer 1620 is changed to block pointer 1720). File B 1302 and file C 1303 both become clone child files, according to which single instantiation is realized in which the files B and C both refer to block areas 1431 and 1432 of the clone parent file.

Figure 8:
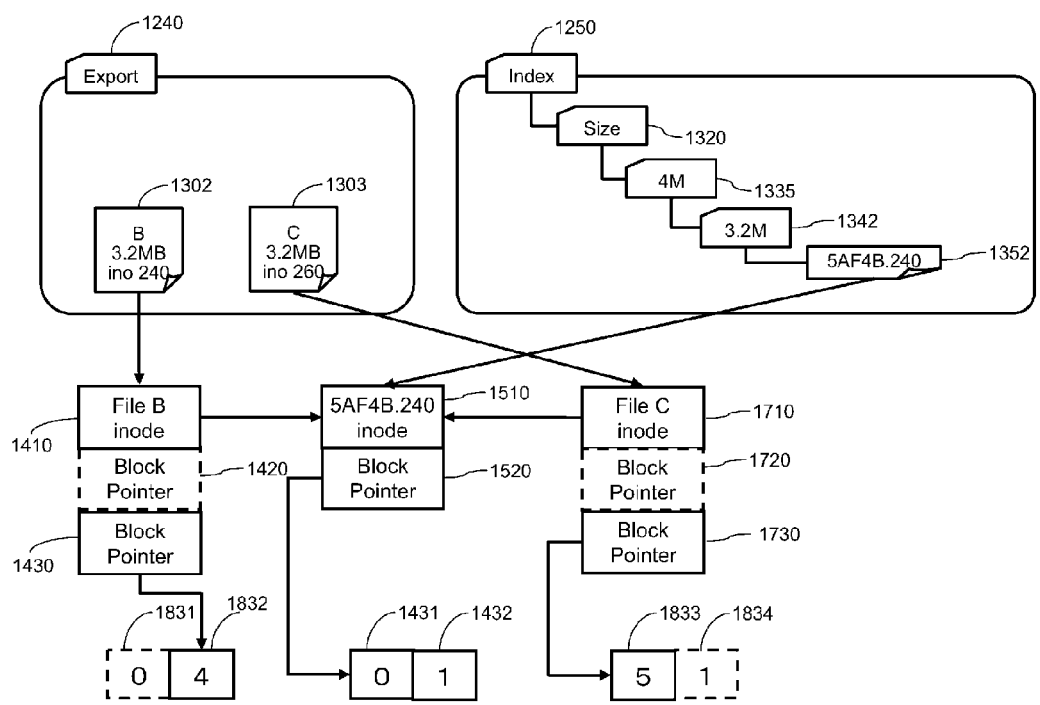
FIG. 8 is a view illustrating a file update operation after performing single instantiation according to the present invention.

FIG. 8 shows the processing of a case where a second logical block area 1832 of file B 1302 and a first logical block area 1833 of file C 1303 have been updated. After the single instantiation processing, until the file B 1302 is subjected to file update, physical block areas are not assigned to logical block areas 1831 and 1832 to which the block pointer 1420 of file B 1302 points.

When the data of the second logical block area 1832 of file B 1302 is updated via file update, a physical block area is assigned to the logical block area 1832 that the block pointer 1430 points to, and data is stored in that physical block area. Similarly in the file update of file C 1303, when the first logical block area 1833 is updated, a physical block area is assigned to the logical block area 1833 that the block pointer 1730 points to, and data is stored in that physical block area. At this time, the inode information of file B and file C are rewritten, and when access occurs to the areas where physical block has been assigned, the data stored in that area is referred to.

Upon accessing the data of file B 1302 after file update, since a physical block area is not assigned to the first logical block area 1831, data of block area 1431 is referred to via the inode information 1510 of the clone parent file. As for the second logical block area 1832, since a physical block area is assigned, the data in the physical block area 1832 is referred to.

During data access of file C after updating the file, since the physical block area is assigned to the first logical block area 1833, the data in the physical block area 1833 is referred to. Since the physical block area is not assigned to the second logical block area 1834, the data in block area 1432 is referred to via the inode information 1510 of the clone parent file.

In the single instantiation method of patent literature 1, when file update is performed after single instantiation, all areas of the file will be actualized (assigned to a physical block area), so that the space reduction effect by single instantiation will become zero. On the other hand, according to the present system, the file update data after single instantiation is stored in the clone child file side, so that the area not subjected to data update is continuously shared among the single instantiated files, so that the space reduction effect by single instantiation is maintained regarding the data where data has not been updated.

Also in snapshot techniques, the updated data is stored separately, but the present invention is more advantageous in that the amount of management information is smaller. Usually, a plurality of generations of snapshots must be acquired in the snapshot technique, so that all areas of each generation must store management information of corresponding data areas. In contrast, the present invention refers to a clone child file side for updated areas and refers to the clone parent file side for non-updated areas, so that only the clone child file side stores updated data as the additional management information and if there is no update data, the system refers to the clone parent file side, so that there is no need for all areas to store corresponding data area management information.

The tree structure of the index directory 1250 has the directory to which a file is stored determined by the file size of the registered file, and the file name of the stored file is determined by the hash value and the inode number. If the file size, the hash value and the inode number of the file being stored in the index directory 1250 is changed in mid-flow, a maintenance processing of the index directory 1250 such as file migration and renaming becomes necessary. The load by such processing may deteriorate the performance of the file storage.

In the present embodiment, the file stored in the index directory 1250 is the clone parent file, and all the single instantiated files of the export directory 1240 are clone child files, wherein the update data is stored in the clone child file side so that the clone parent file stored in the index directory 1250 which is a hidden directory will not be updated by the user. Thus, the file size, the hash value and the inode number of the files stored in the index directory 1250 will not be changed even if the file in the export directory 1240 is updated. Therefore, the maintenance processing of the index directory 1250 becomes unnecessary and the deterioration of file storage performance by the load of maintenance processing can be prevented.

Figure 9:
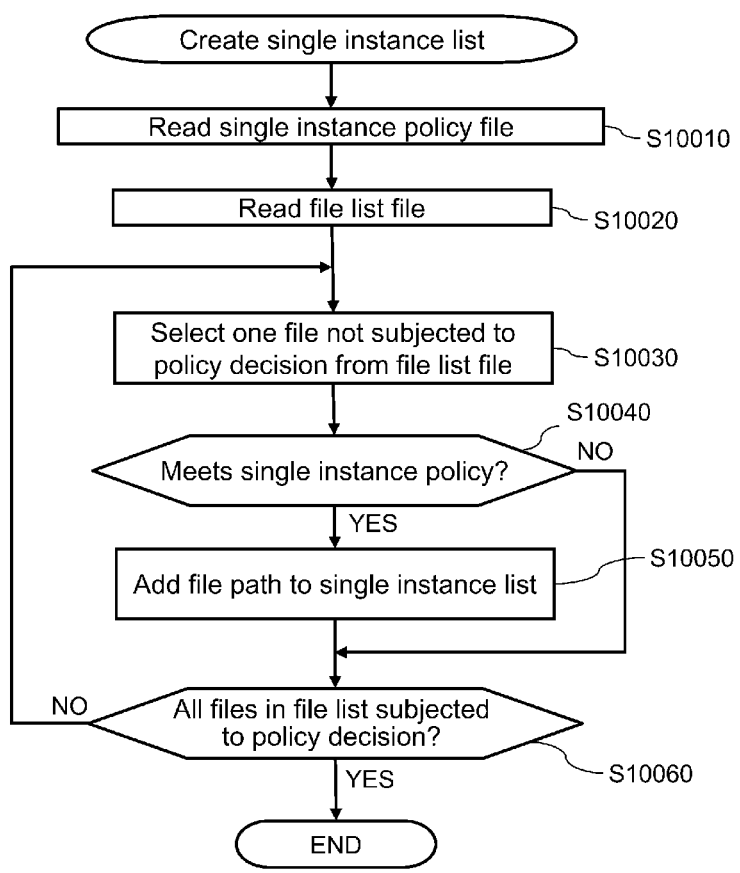
FIG. 9 is a flowchart illustrating a single instance list creation processing according to an embodiment of the present invention.

FIG. 9 shows a flow of creating a single instance list. The present processing is executed by the policy decision program 1123 by which a single instance list 1236 is created. The present flow relates to a process for determining whether each file should be single instantiated or not prior to determining whether single instantiation is possible or not.

In S10010, a single instance policy file 1232 is read. The single instance policy file 1232 stores a policy used for creating a single instance list file. For example, creation time and date, update time and date, access time and date, file size, file extension, file system name, directory name, file name and the like are set as the policy. These policies are set up by a system administrator or the like of the user via a NAS manager 1212 or an input device coupled thereto. For example, when a file is single instantiated (or cloned as shown in FIG. 3), the file access response speed may drop, so that it is possible to perform settings so that the files having a new update date tending to have a high file access possibility will not be subjected to single instantiation.

In S10020, a file list file 1231 is read. The file list file 1231 is created by a notify program 1122. The file system 1125 notifies the notify program 1122 when a file change occurs, such as a creation of a new file, file update, and file delete. The notify program 1122 adds a file path of the relevant file to the file list file 1231 when the above-described notification is received.

In S10030, one file listed in the file list file 1231 and not yet subjected to policy decision is selected. In S10040, the file selected in S10030 is subjected to decision based on the policy stated in the single instance policy file 1232. If the file meets the policy, the procedure advances to S10050, and if not, the procedure advances to S10060.

In S10050, the file path of a file having met the policy is added to the single instance list file 1236. The files added to the single instance list file 1236 is a file being subjected to determination on whether single instantiation is possible or not. In S10060, when a next file exists in the file list file 1231, the procedure returns to S10030, and when the policy decision of all files listed in the file list file 1231 is completed, the present processing is ended.

<Flowchart of Single Instantiation Processing>

Figure 10:
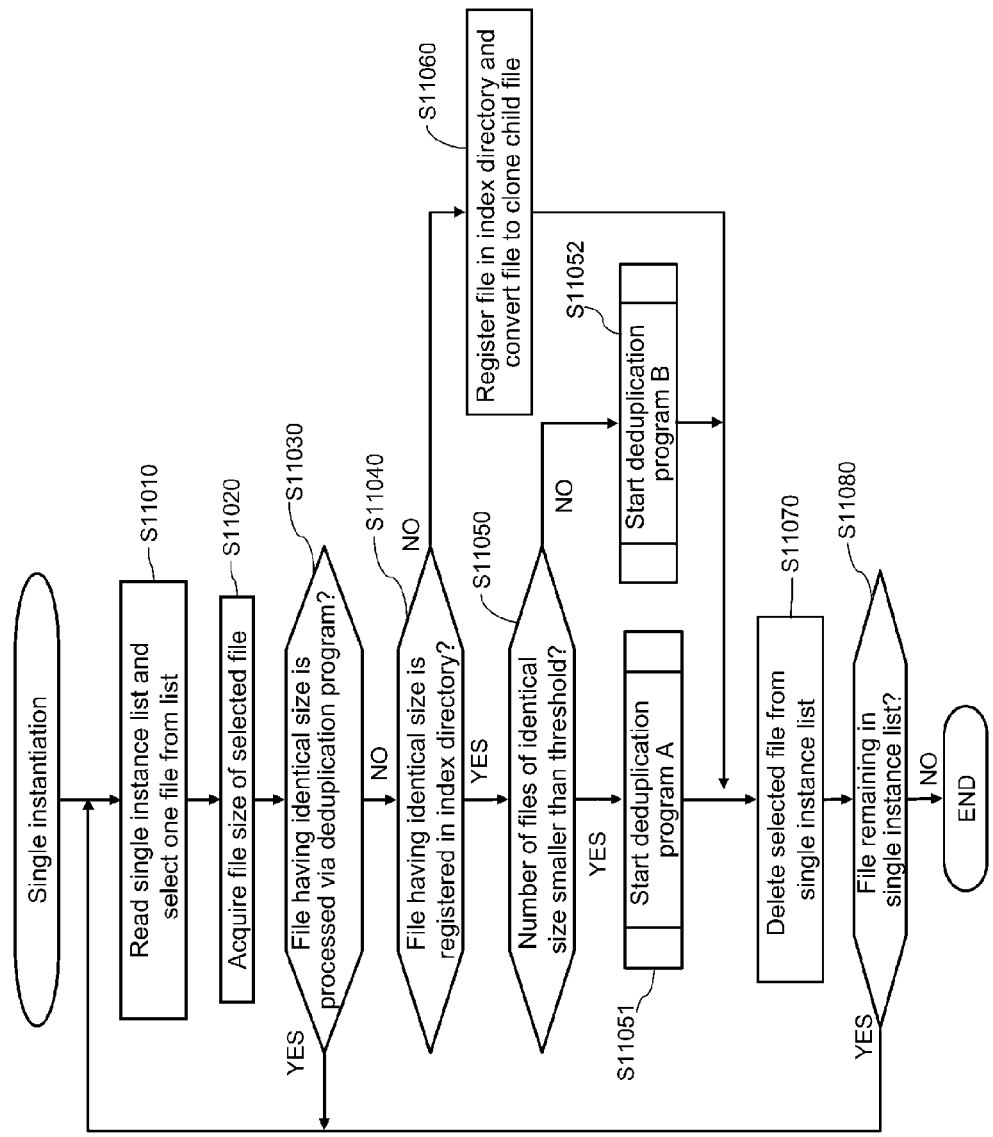
FIG. 10 is a flowchart illustrating a single instantiation processing according to a preferred embodiment of the present invention.
Figure 11:
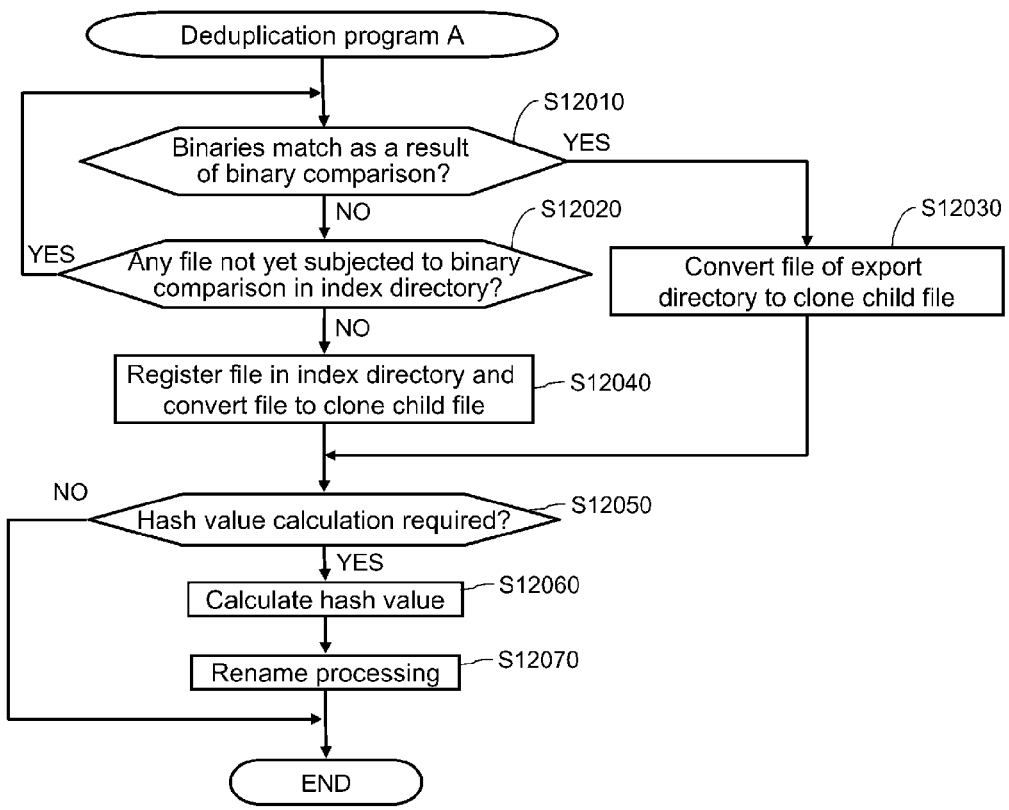
FIG. 11 is a flowchart illustrating a de-duplication program processing (1) according to a preferred embodiment of the present invention.
Figure 12:
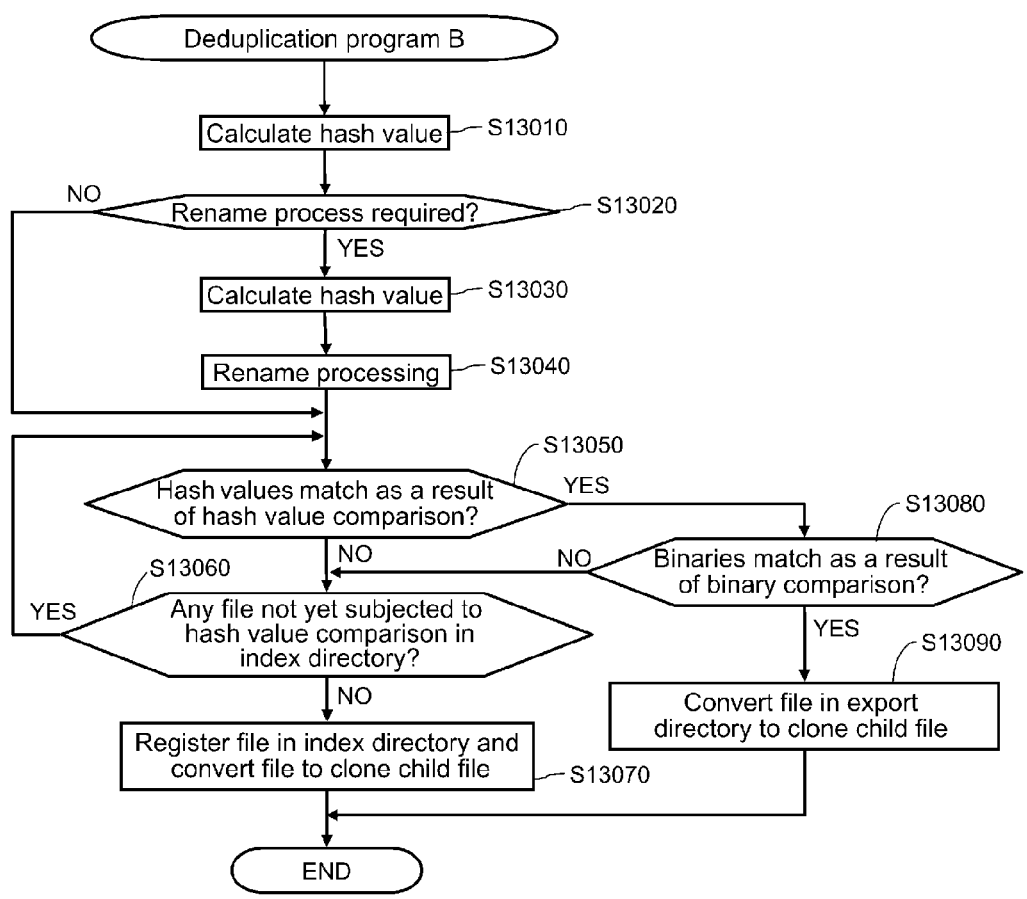
FIG. 12 is a flowchart illustrating a de-duplication program processing (2) according to a preferred embodiment of the present invention.

FIGS. 10, 11 and 12 are flowcharts illustrating the single instantiation processing. The present processing is executed via a single instance program 1124. The single instance program 1124 is composed of a file classify program 1233, a de-duplication program 1234 and a file clone program 1235, wherein the respective programs cooperate to realize the single instantiation processing.

The file classify program 1233 performs the overall control of the single instantiation processing mainly shown in FIG. 10, and the de-duplication program 1234 performs the processes illustrated in FIGS. 11 and 12. The file clone program 1235 performs cloning of the files according to FIGS. 10, 11 and 12.

With reference to FIG. 10, in S11010, the file classify program 1233 reads the single instance list 1236, and sequentially processes the files listed in the single instance list 1236. There is no limit to the order in which the files are processed, but since the files having greater file sizes have greater amount of space reduction, so for example, the files may be processed in order from those having largest file sizes. However, in order to process files from those having largest file sizes, a load is applied to check the capacity of the files, so that by gradually reducing the single instantiation target file size specified in single instance policy 1232, a similar effect as rearranging the files can be achieved. If single instantiation processing is not completed within a given time set in advance, the processing may be discontinued. Thus, when single instantiation of files having large file sizes having a great space reduction effect is completed, a certain level of space reduction is achieved.

In S11020, the file size of the file selected in S11010 is acquired. For example, the file size is acquired using a STAT system call function of the file system 1125. In S11030, whether a file having the same file size as the file selected in S11010 is being processed via a de-duplication program is checked, and when such file is processed, the processing of that file is postponed and the process is returned to S11010 to process the next file.

This is because during file size comparison described in detail later, the index directory 1250 is used, but the registering of files to the index directory is also performed by the de-duplication program 1234, so that when files having identical file sizes is simultaneously processed via a file classify program 1233 and a de-duplication program 1234, a leak may possible occur during file size comparison. If the file having an identical file size is not processed via the de-duplication program 1234, the procedure advances to S11040.

Due to this control, the file classify program 1233 can start the next process after starting the de-duplication program 1234 without waiting for the program to end, and high speed processing becomes enabled by the file classify program 1233 and the de-duplication program 1234 being executed simultaneously and in parallel. Further, a plurality of de-duplication programs 1234 can be simultaneously started in parallel.

In S11040, whether a file having an identical file size as the file selected in S11010 is registered in the index directory 1250 or not is checked. The index directory stores file sizes as the actual size directory names, and the full path of the directory is known in advance, so that the return value of issuing an actual size directory to a file system such as an opendir system call or stat system call can be used to determine whether the file having an identical file size is stored in the index directory 1250 or not. As a result, file size determination can be performed at higher speed than creating an index size list and performing binary search. If a file having the same file size is not registered, the procedure advances to S11060, and such file is registered, the procedure advances to S11050.

In S11050, it is determined whether the number of files having the same file size is smaller than a threshold or not, and if the number is smaller than a threshold value, the procedure advances to S11051 and a de-duplication program A is started, while if the number is equal to or greater than the threshold value, the procedure advances to S11052 and a de-duplication program B is started. The threshold value can be set via a NAS device 1000, and can be set using a NAS manager 1212, for example. If the number of files having identical file sizes is small, such as one or two, the duplication detection processing can be performed in a shorter period of time by performing binary comparison via a round-robin system without performing hash value comparison.

On the other hand, if there is a large number of files having identical file sizes, binary comparison via round-robin system may take too much time. Further, if the file size is large and the binary comparison time is long, and if the hash calculation is simple, the total processing time may be shortened by performing hash value comparison from the first file comparison. In contrast, if the file size is small and the binary comparison time is short, and if the number of files within the actual size directory is small, such as two, the total processing time may be shortened by only performing binary comparison and not performing hash value comparison, so that the hash value comparison can be performed from the third or fourth file in the actual size directory. Starting from which file from the top of the actual size directory the harsh value comparison should be used in combination with binary comparison to reduce the total processing time depends on the comparison target file size, so that it is possible to change which file from the top of the actual size directory the harsh value comparison should be performed for each range size directory. In order to solve this problem, when there are a large number of files having identical file sizes, de-duplication program B is started to perform hash value comparison in addition.

The file of the export directory 1240 selected in S11010 and the file in the index directory 1250 found in S11040 are designated to start the de-duplication program 1234. If there are a number of files having the same file size in the index directory 1250, all the corresponding files are designated. Since the control described in S11030 exists, the procedure advances to S11070 without waiting for the started de-duplication program 1234 to end. A plurality of de-duplication programs 1234 can be started at the same time. In S11060, regarding the file in the export directory 1240 selected in S11010, the file is registered in the index directory 1250 as described in FIGS. 3 and 5 and the file is converted to a clone child file.

In S11070, after the single instantiation processing of the file in the export directory 1240 selected in S11010 is ended, the file subjected to single instantiation is deleted from the single instance list 1236. In S11080, when a file remains in the single instance list 1236, the procedure returns to S11010, and the next file is processed. When there are no remaining files, the single instantiation processing is ended.

FIG. 11 is a flowchart of the processing of de-duplication program A started in S11051 of FIG. 10. In S12010, the binary comparison is performed among files designated by the file classify program 1233. When binaries do not correspond, the procedure advances to S12020, wherein when binaries correspond, the procedure advances to S12030.

In S12020, if there are a plurality of files having identical file sizes in the index directory 1250, the plurality of files in the index directory 1250 are designated by the file classify program 1233. When there is a next binary comparison candidate, the procedure returns to S12010. When there is no subsequent binary comparison candidate, the procedure advances to S12040. In S12040, regarding the file in the export directory 1240 designated by the file classify program 1233, the file is registered in the index directory 1250 described with reference to FIGS. 3 and 5 and the file is converted to a clone child file.

In S12030, single instantiation described with reference to FIG. 6 is performed regarding the file in the export directory 1240 designated by the file classify program 1233. In S12050, determination is made on whether hash value calculation is necessary or not. As for the file registration of the index directory 1250, when a <nohash> file is included in the file of the index directory 1250 designated by the file classify program 1233, hash value calculation of the <nohash> file must be performed, and the procedure advances to S12060. If a <nohash> file is not included, the hash value calculation is not necessary, and the processing of de-duplication program A will be ended.

In S12060, a hash value calculation of a <nohash> file is performed. If hash value calculation is performed after binary comparison, the probability of cache hit of actual data of the file required to perform hash value calculation becomes high, and processing may be performed at high speed. It is also possible to perform hash value calculation when actual data of the file is read during binary comparison. In S12070, the hash value calculated in S12060 is used to perform a rename processing to <hash value>.<inode number>, and the processing of de-duplication program A is ended.

With reference to FIG. 12, the de-duplication program B performed when the number of files having identical file sizes in an index directory is greater than a threshold will be described. In S13010, the hash value of the file of the export directory 1240 designated by the file classify program 1233 will be calculated.

In S13020, regarding the file of index directory 1250 designated by the file classify program 1233, if there is a <nohash> file in which the hash value has not yet been calculated, a hash value calculation and rename processing is required. If there is a <nohash> file and rename processing is required, the procedure advances to S13030, and if not, the procedure advances to S13050. In S13030, the hash value of a file requiring a rename processing is calculated. In S13040, the file is subjected to rename processing to a <hash value>.<inode number> using the hash value computed in S13030.

In S13050, the hash value computed in S13010 is compared with the hash value of the file in the index directory designated by the file classify program 1233 which is stored as file names. When the hash values do not match, the procedure advances to S13060, and when the hash values correspond, the procedure advances to S13080. In S13060, if there are a plurality of files having identical file sizes in the index directory 1250 and a next hash value comparison candidate exists, the procedure returns to S13050. If there is no next hash value comparison candidate, the procedure advances to S13070.

Figure 3:
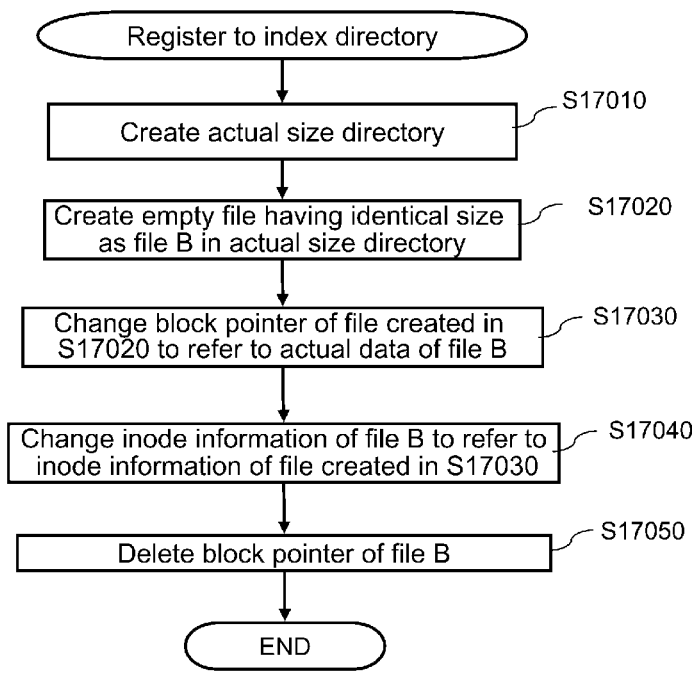
FIG. 3 is a flowchart for illustrating the operation of file cloning and file registration to an index directory according to an embodiment of the present invention.

In S13070, regarding the file in the export directory 1240 designated by the file classify program 1233, the file registration to the index directory 1250 and a clone child file conversion as described with reference to FIGS. 3 and 5 are performed. At this time, since the hash value of the file of the export directory 1240 is computed in S13010, the file is registered not by the file name of <nohash>.<inode number> but by the file name of <hash value>.<inode number> to the index directory 1250, and the processing of the de-duplication program B is ended.

When the hash values match in S13080, binary comparison is performed further. When binaries do not match, the procedure advances to S13060, and when binaries match, the procedure advances to S13090. In S13090, the single instantiation described with reference to FIG. 6 is performed regarding the file of the export directory 1240 designated by the file classify program 1233, and the processing of the de-duplication program B will be ended. Further, by performing hash value calculation during binary comparison, even if there is a large number of files having identical file sizes but with different contents, the number of meaningless binary comparison via hash value comparison can be reduced.

Figure 13:
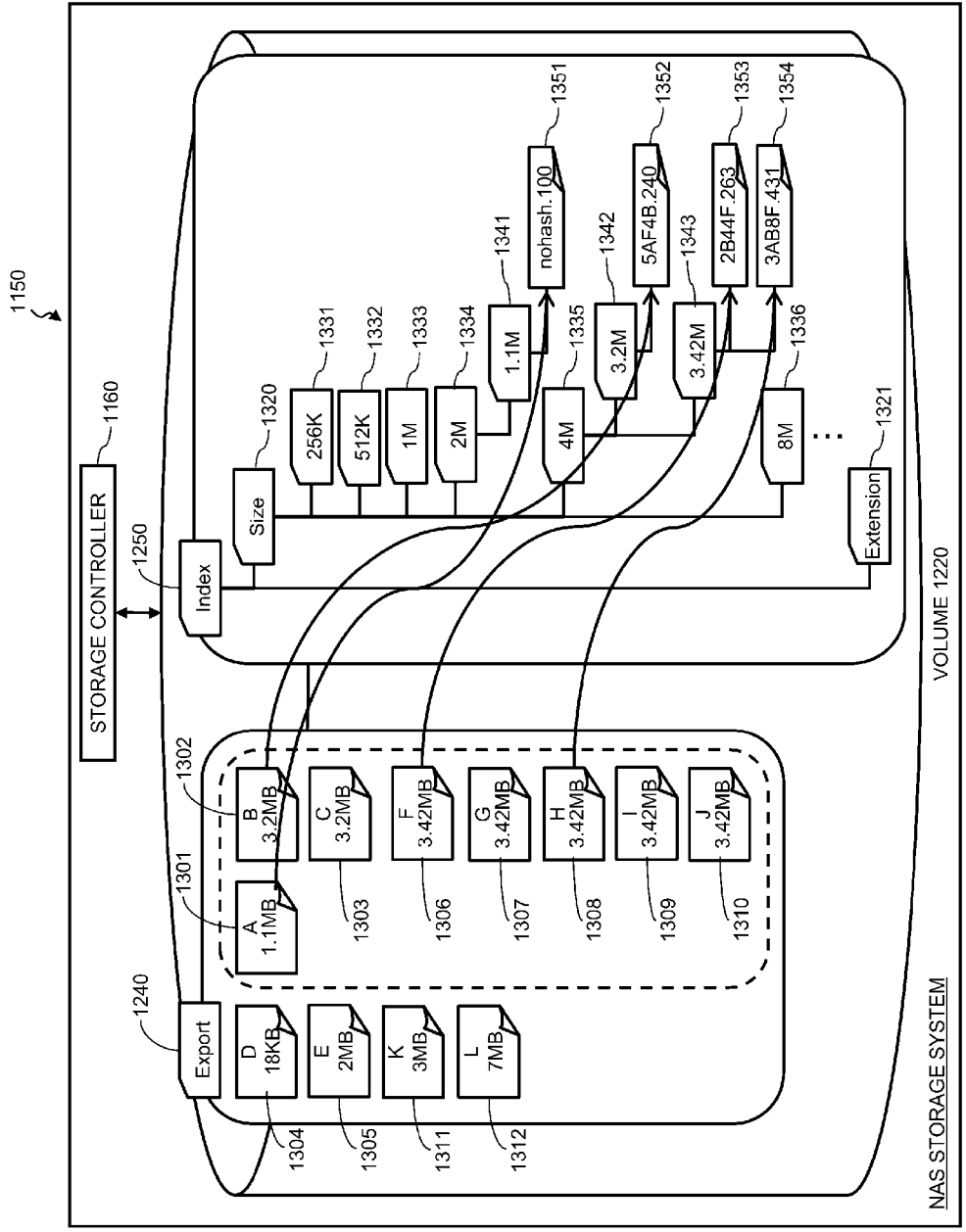
FIG. 13 is a conceptual diagram illustrating a configuration of an index directory according to the present invention.

One example of a processing according to a present invention is described with reference to FIG. 13. It shows as an example how file A 1301, file B 1302, file C 1303, file F 1306, file G 1307, file H 1308, file I 1309 and file J 1310 stored in a single instance list 1236 of the index directory 1250 (file D 1304, file E 1305, file K 1311 and file L 1312 are not in the list) are registered in the index directory 1250. The file size of file A 1301 is 1.1 MB, the file size of files B 1302 and file C 1303 are 3.2 MB and the contents thereof are the same, the file size of file F 1306, file G 1307, file H 1308, file I 1309 and file J 1310 is 3.42 MB and all the same, wherein the contents of file F 1306 and file G 1307 are the same data, the contents of file H 1308, file I 1309 and file J 1310 are the same data, but differs from the contents of file F 1306 and file G 1307.

A size directory 1320 exists below the index directory 1250, and the file size information and hash value are registered in the directory. Detailed description is omitted in the present specification, but when file de-duplication is performed using the file extension, an extension directory 1321 is created and extension information is registered in the directory. Other than the size directory 1320 and the extension directory 1321, various directories for storing information that can be used for file de-duplication can be created.

Range size directories 1331 through 1336 are created within the size directory 1320. The range size directory is created so as to prevent deterioration of performance of file system by preventing stored directories and files from being concentrated in a specific directory. For example, files having a file size smaller than 256 KB are registered in a 256 K directory 1331. Files having a file size equal to or greater than 256 KB and smaller than 512 KB are registered in the 512 K directory 1332. Files having a file size equal to or greater than 512 KB and smaller than 1 MB are registered in the 1 M directory 1333. Files having a file size equal to or greater than 1 MB and smaller than 2 MB are registered in the 2 M directory 1334. Files having a file size equal to or greater than 2 MB and smaller than 4 MB are registered in the 4 M directory 1335. Files are registered in a similar manner to 8 M directory 1336 and so on.

The granularity of the range size directory can be set freely, and ideally, they should be set up so that the number of directories and the number of files stored in each range size directory are equalized. It is also possible to set up the range size directory by analyzing the files in the file system subjected to single instantiation and analyzing the file distribution of each file size range.

In the initial state, a size directory 1320 and range size directories 1331 through 1336 are created. The processes regarding file A 1301 is shown below. At first, the single instance program 1124 checks whether a file having the identical file size as file A 1301 is already registered in an index directory 1250 or not. Since a file having a file size of 1.1 M which is the same as file A is not yet registered, an actual size directory 1341 is created in the 2 M directory 1334 in which the file size is set as the directory name. As for file A 1301, a 1.1 M directory 1341 is created. Then, a clone parent file 1351 having a file name <nohash>.<100 (inode number of file A)> is created in the actual size directory, and the file A 1301 stored in the export directory 1240 is converted to a clone child file.

Next, the processing regarding file B 1302 is shown below. Similar to file A 1301, since the file has a file size that is not registered in the index directory, a 3.2 M directory 1342 which is an actual size directory is created in the 4 M directory 1335 which is a range size directory, a clone parent file 1352 having a file name <nohash>.<240 (node number of file B)> is created in the directory, and file B 1302 stored in the export directory 1240 is converted to a clone child file.

Next, processing regarding file C 1303 will be illustrating below. Since file B 1302 and file C 1303 are identical files, the files should be single instantiated. At first, the procedure checks whether the same file size has been registered in the index directory 1250, and in the present example, the existence of a file having the identical file size is recognized since there already exists a 3.2 M directory 1342. The aforementioned check is a file size comparison for file de-duplication, wherein for example, when an actual size directly is opened via an opendir system call or when an actual size directory information is acquired via a stat system call, the return value thereof enables the system to recognize that a file having the same file size already exists. As a result of file size comparison, since a file having identical file sizes already exists, binary comparison is performed for file 1352 stored in the actual size directory 1342 and the file C 1303.

Since file B 1302 and file C 1303 are identical files, the result of binary comparison of file 1352 and file C 1303 corresponds. As a result of binary comparison, the file C 1303 is converted to a clone child file having file 1352 as the clone parent file. Thereby, single instantiation of file B 1302 and file C 1303 is realized. Further, hash value calculation is performed during binary comparison. Anything can be used as the hash function, wherein other than normal hash calculation using all data of the file, the start 4 KB and the end 4 KB of the file can be used to calculate the hash value using a SHA1 (Secure Hash Algorithm 1) hash function, and using the first five digits of the respectively added value as the hash value. Final file duplication is determined by binary comparison, so that a hash value calculation method requiring a small calculation cost is sufficient. Using the calculated hash value, the file name 1352 is renamed from <nohash.240> to <5AF4B.240>.

Next, the process regarding file F 1306 will be shown below. Similar to file A 1301, since the file size is not registered in the index directory, a 3.42 M directory 1343 which is an actual size directory is created in the 4 M directory 1335 which is a range size directory, a clone parent file 1353 having <nohash>.<263 (inode number of file F) as file name is created in the directory, and the file F 1306 stored in the export directory 1240 is converted to a clone child file.

Next, processing regarding file G 1307 is shown below. Since file F 1306 and file G 1307 are identical files, the files should be single instantiated. At first, the single instance program 1124 checks whether the same file size has been registered in the index directory 1250, and in the present example, the existence of a file having the identical file size is recognized since there already exists a 3.42 M directory 1343. As a result of file size comparison, since a file having identical file size already exists, binary comparison is performed to file 1353 stored in the actual size directory 1343 and file G 1307.

Since file F 1306 and file G 1307 are identical files, the result of binary comparison of file 1353 and file G 1307 corresponds. As a result, file G 1307 is converted to a clone child file having file 1353 as the clone parent file. Thereby, single instantiation of file F 1306 and file G 1307 is realized. Further, hash value calculation is performed during binary comparison. Using the calculated hash value, the file name 1352 is renamed from <nohash.263> to <2B44F.263>.

Next, the process regarding file H 1308 is shown below. File H 1308 has a same file size as file F 1306 and file G 1307 but has a different data content, so that the file should not be single instantiated. At first, the single instance program 1124 checks whether a same file size is already registered in the index directory 1250 or not, and since a 3.42 M directory 1343 already exists, the single instance program 1124 recognizes that a file having the same file size exists. As a result of comparison of file size since a file having a same file size already exists, the file 1353 stored in the actual size directory 1343 and file H 1308 is subjected to binary comparison.

Since file F 1306 and file H 1308 are not identical files, the result of binary comparison of file 1353 and file H 1308 do not correspond. At this time, if an identical file of file H 1308 is found in the subsequent processing, the files should be single instantiated, so that file H 1308 is registered in the index directory 1250. Hash value calculation is performed at the time of binary comparison, and a clone parent file 1354 having a file name <hash value>.<inode number of file H> (3AB8F.431) is created in the 3.42 M directory 1343, and thereafter, the file H 1308 stored in the export directory 1240 is converted to a clone child file.

In binary comparison, if the file has a large file size, the whole file cannot be stored in the memory, so that normally, the file is divided into given sizes and read in the memory, which is subjected to data comparison. At this time, when data inconsistency occurs, the reading of subsequent data can be cancelled. Therefore, if the hash value calculation adopts a method of using the first 4 KB and the last 4 KB of data, when data inconsistency occurs during binary comparison, the last 4 KB of data may not be read in if binary comparison is performed sequentially from the beginning. Therefore, by adopting a system of initially performing binary comparison of the first section and the last section, it becomes possible to improve the cache hit rate during hash value calculation.

Next, a process regarding file I 1309 will be described below. Since file H 1308 and file I 1309 are identical files, they should be subjected to single instantiation. At first, the single instance program 1124 checks whether the same file size is already registered in the index directory 1250, and in this case, a 3.42 M directory 1343 already exists, so the single instance program 1124 recognizes that a file having the same file size exists. In the example, since a file having an identical file size already exists, the files 1353 and 1354 stored in the actual size directory 1343 and the file I 1309 are subjected to binary comparison. As a result of binary comparison of files 1353 and 1354, the binaries do not correspond, so that the files are independently registered in the index directory 1250, so that when a plurality of files are stored in the actual size directory, it is guaranteed that the binaries of the files differ.

Since hash values are included in the files names of files 1353 and 1354 registered in the index directory 1250, they can be subjected to hash value comparison without performing hash value calculation, but since the hash value of file I 1309 must be calculated, the binary comparison of file I 1309 and file 1353 is first performed, and hash value calculation is performed together with the binary comparison. Since the content data of file I 1309 and file 1353 differ, the result of binary comparison is binary mismatch.

Thereafter, file I 1309 and file 1354 are compared, and at this time, since the hash value of file I 1309 is known, the hash value comparison of file I 1309 and file 1354 is performed. When the hash values match, binary comparison is further performed, and when the hash values or the binaries do not match, the hash value of file I 1309 is further compared with another file if there is another comparison target within the actual size directory. In the case of file I 1309, as a result of hash value comparison with file 1354, the hash values match, and the result of binary comparison is binary matching.

Therefore, the file I 1309 is changed into a clone child file having file 1354 as the clone parent file. Thereby, single instantiation of file H 1308 and file I 1309 is realized. If all of the actual files have hash value or binary mismatch, a clone parent file having a file name <hash value>.<inode number> is created in the actual size directory, and the file stored in the export directory is converted to a clone child file.

Next, the processing regarding file J 1310 will be shown below. Since file H 1308, file I 1309 and file J 1310 are identical files, they should be subjected to single instantiation. At first, the single instance program 1124 checks if the same file size is already registered in the index directory 1250, and since a 3.42 M directory 1343 exists, the single instance program 1124 recognizes that a file having the identical file size exists. As a result of file size comparison, since a file having the identical file size already exists, the files 1353 and 1354 stored in the actual size directory 1343 and the file J 1310 are subjected to binary comparison.

Since the data contents of file J 1310 and file 1353 differ, the result of binary comparison is binary mismatch. Next, file J 1310 and file 1354 are compared, but at this time, since the hash value of file J 1310 is already known, at first, file J 1310 and file 1354 are subjected to hash value comparison. As a result of hash value comparison of file J 1310 and file 1354, the hash values correspond, and the result of binary comparison is binary matching. Therefore, the file J 1310 is converted to a clone child file having file 1354 as the clone parent file. Therefore, file H 1308, file I 1309 and file J 1310 are subjected to single instantiation.

In the above description, binary comparison was performed for comparison with the first file in the actual size directory and hash value comparison was performed for comparison with the second and subsequent files, but it is also possible to first calculate the hash value of the file in the export directory and to perform hash value comparison of all the files in the actual size directory. If the file size is large and binary comparison time is long while hash calculation is simple, the total processing time may be shortened by performing hash value comparison from the first file comparison. In contrast, if the file size is small and binary comparison time is short, if the number of files in the actual size directory is as small as two, for example, the total processing time may be shortened by performing only binary comparison without performing hash value comparison, so it is possible to design the system to perform hash value comparison from the third or fourth file in the actual size directory. From which file in the actual size directory hash value comparison should be performed together with binary comparison to reduce the total processing time depends on the file size of the comparison target, so that the number of files from the top of the actual size directory which is set to be subjected to hash value comparison can be changed for each range size directory.

According to the present invention, file duplication is detected through file size comparison, and the files having identical file sizes are subjected to binary comparison. In file size comparison, only the metadata of the file should be read, and there is no need for the actual data to be read as in hash value comparison, so that the processing does not have any overhead via read processing and the speed of the processing can be enhanced.

Further, the present invention is especially effective in a file having a large file size and a tendency in which when the file size is identical the result of binary comparison is also identical, but even in a file having a small file size, the effect of space reduction and increase in speed of processing which are the object of single instantiation can be realized.

Further, hash value comparison is performed when binary comparison is performed, and by adding hash value information to the index directory, if there are many files having identical file sizes but with different data contents, hash value comparison can also be performed to minimize fruitless binary comparison.

(2) Second Embodiment

Now, the second embodiment of the present invention will be described. In the following description, the differences with the first embodiment will be mainly described, and the common portions with the first embodiment are omitted from the description.

An automatic delete processing of the clone parent file will be described with reference to the second embodiment of the present invention. Since the clone parent file is stored in an index directory 1250 which is a hidden directory, the file is not disclosed to the user. Therefore, unnecessary clone parent files will remain as waste files unless the NAS device 1000 deletes the files. Therefore, the NAS device 1000 has a function to automatically delete the clone parent file when the clone parent file becomes unnecessary. For example, this function is realized via a file system 1125. The clone parent file becomes unnecessary when there are no clone child files referring to the clone parent file. Therefore, when a clone child file is deleted, the system determines whether to perform the delete processing of the clone parent file.

Figure 14:
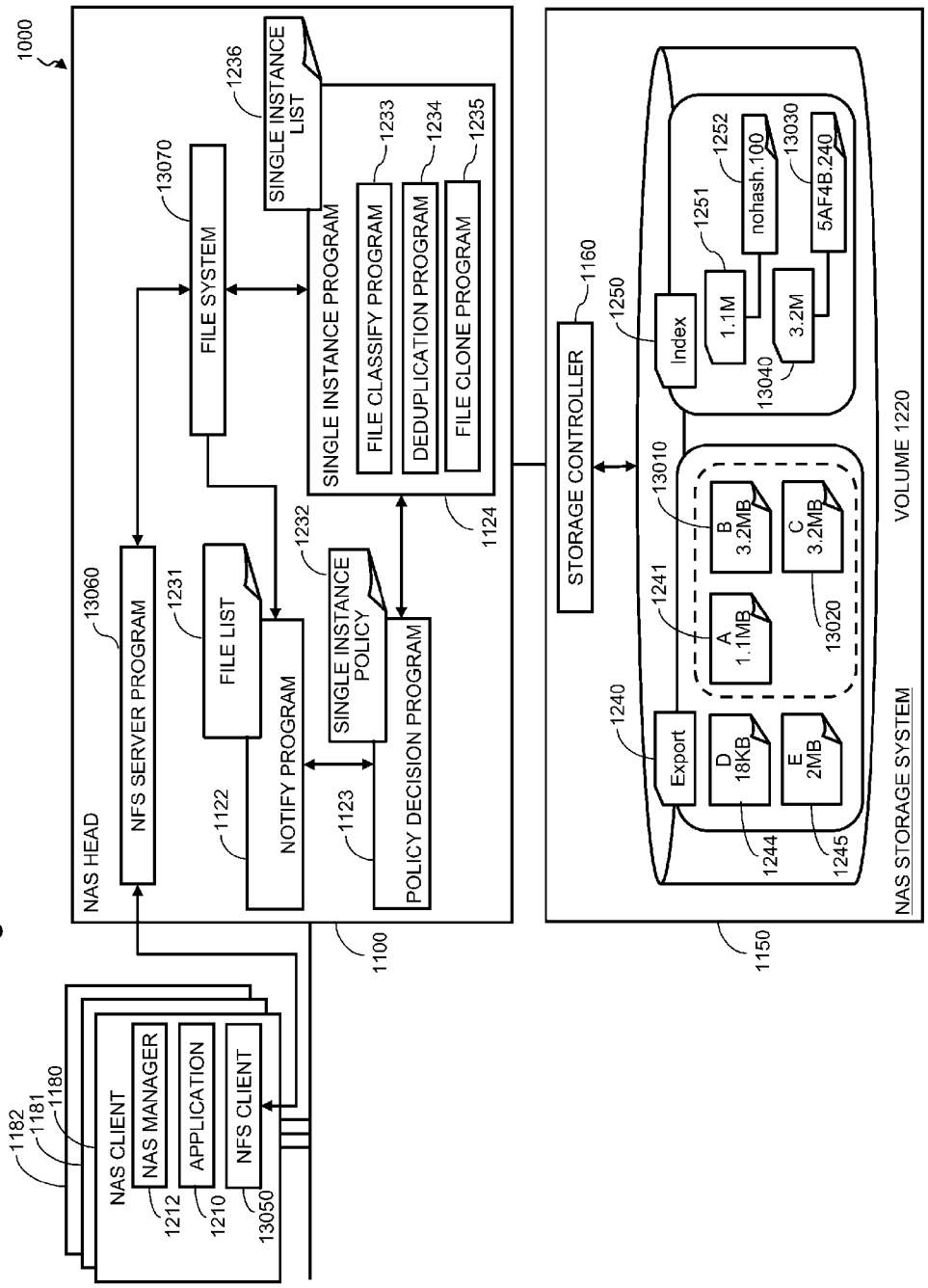
FIG. 14 is a view showing a physical and logical configuration of an information processing system according to a second embodiment of the present invention.

In FIG. 14, an example is illustrated in which when file B 13010 and file C 13020 are single instantiated with the file 13030 set as the clone parent file, file B 13010 and file C 13020 are deleted by the user, by which the file 13030 is automatically deleted.

The user accesses the file system 13070 via the NFS server program 13060 through use of the NFS client 13050. The files in the export directory 1240 are exposed to the user, but the files in the index directory 1250 are not visible to the user. The file 13030 as clone parent file is referred to from file B 13010 and file C 13020, so the reference counter thereof is set to 2. At first, the user deletes file B 13010. When the clone child file is deleted, the reference counter of the reference destination clone parent file is decremented (−1). Thereby, the reference counter of file 13030 as clone parent file is set to 1. The file 13030 as clone parent file is still referred to from file C 13020, so it will not be deleted.

Next, the user deletes file C 13020. The reference counter of file 13030 as clone parent file is decremented again (−1) and set to 0. Since there are no more clone child files referring to the file 13030 as clone parent file, the file 13030 becomes un-necessary, so the system deletes file 13030 via a file system 13070, for example.

Furthermore, since the actual size directory 13040 in which file 13030 was stored becomes empty and there are no more files having a file size of 3.2 MB registered in the index directory 1250, the actual size directory 13040 is also deleted. Further, regarding the deleting of the actual size directory, the actual size directory exists when comparing file sizes in the file classify program 1233, but when the number of files in the actual size directory is zero, it is possible to perform a file registration process to the index directory instead of the delete processing of the actual size directory.

Figure 15:
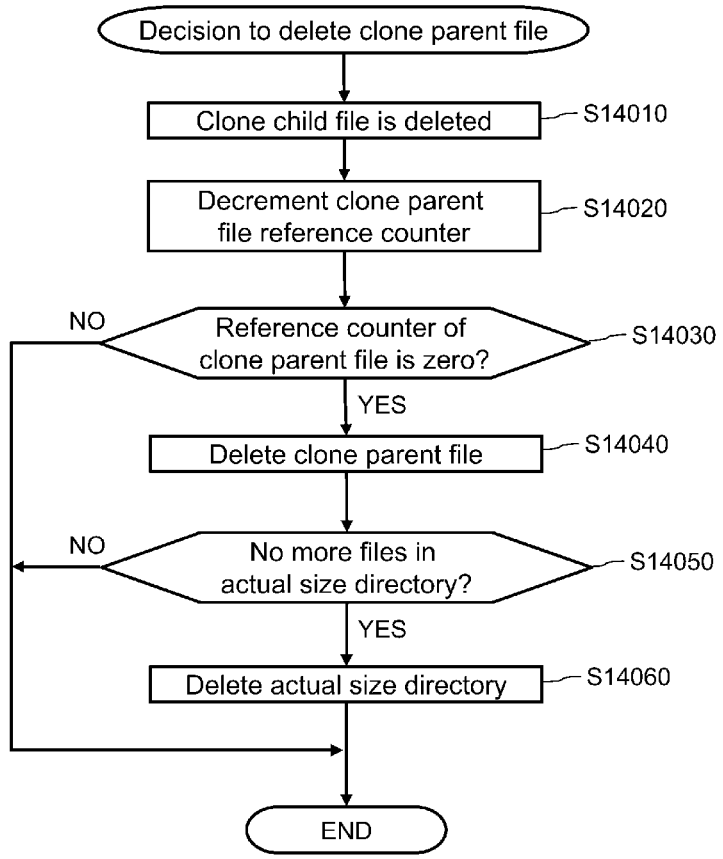
FIG. 15 is a flowchart illustrating a delete determination processing of a clone parent file according to the second embodiment of the present invention.

FIG. 15 shows a flowchart of a delete determination processing of the clone parent file. The present processing is performed for example via a file system 13070. The user deleting the clone child file stored in the export directory 1240 triggers the file system 13070 to execute the processing illustrated in FIG. 15.

In S14010, the clone child file is deleted. In S14020, the reference counter of a clone parent file referred to by the deleted clone child file is decremented (−1). In S14030, if the reference counter of the clone parent file becomes zero, the procedure advances to S14040, and if not, the present processing is ended. In S14040, the clone parent file is deleted.

In S14050, if the number of files stored in the actual size directory 13040 where the clone parent file is stored becomes zero, the procedure advances to S14060, and if not, the present processing is ended. In S14060, the actual size directory is deleted and the present processing is ended.

In the present processing, when there are no more clone child files by deleting or the like, the unnecessary clone parent file will be deleted. According to this processing, there will be no unnecessary clone parent files having data remaining in the volume, so the storage capacity of the volume can be used more efficiently. Further, since the actual size directory is also deleted, the process of comparing file sizes with an empty directory will no longer be performed in the file size comparison of FIG. 10, so that the speed of the processing is enhanced and errors are reduced.

(3) Third Embodiment

Now, the third embodiment of the present invention will be described. In the following description, the differences between the third embodiment and the first embodiment are mainly described, and the common sections with the first embodiment are omitted from the description.

The third embodiment of the present invention illustrates a split processing. Split processing is a processing for returning a clone file to a normal file, wherein according to the present invention, split processing is utilized in the process for returning a single instantiated file to a normal file. When split processing is performed, the number of clone child files referring to a clone parent file is reduced, so that when there are no more clone child files referring to the clone parent file, the clone parent file itself is deleted.

Split processing is utilized in cases, for example, when a clone child file is updated and the difference between the clone child file and the clone parent file becomes too large and the data of the clone parent file may become useless, split processing is performed to solve the situation, or when a wrong file is turned into a clone child file, or when the access frequency to the clone child file is increased so that the child file must be reconverted to a normal file.

Figure 16:
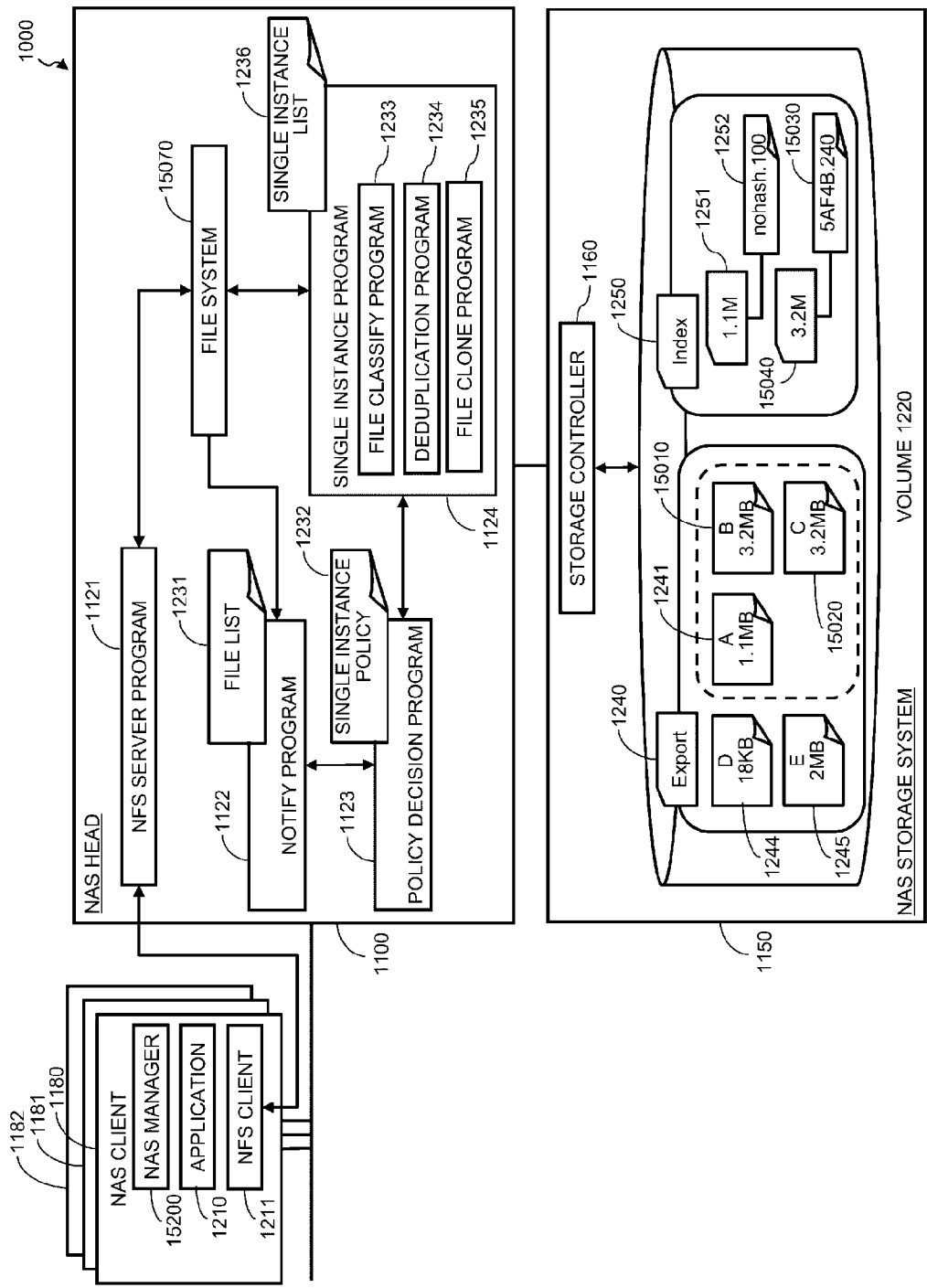
FIG. 16 is a view showing a physical and logical configuration of an information processing system according to a third embodiment of the present invention.

FIG. 16 illustrates an example where file B 15010 and file C 15020 are subjected to split processing in a state where file B 15010 and file C 15020 are single instantiated having file 15030 set as the clone parent file. Split processing is executed by a system administrator designating the files to be split and issuing a split command to the NAS device 1000 using a NAS manager 15200, for example.

At first, the system administrator splits file B 15010. The data of the area other than the update data that file B 15010 has, that is, the data of the area referring to the clone parent file is copied from the clone parent file to the clone child file, and file B 15010 is converted into a normal file from a clone child file. Then, the reference counter of the reference destination clone parent file is decremented (−1). Thereby, the reference counter of the file 15030 as the clone parent file is set to 1. The file 15030 as the clone parent file is not deleted since it is still referred to by file C 15020.

Next, the system administrator splits file C 15020. The data of the area other than the updated data that file C 15020 has, that is, the data of the area referring to the clone parent file is copied from the clone parent file to the clone child file, and file C 15020 is converted into a normal file from a clone child file. Then, the reference counter of the file 15030 as clone parent file is further decremented (−1) and becomes zero.

Since there are no more clone child files referring to the file 15030 as clone parent file, file 15030 becomes unnecessary, so the system deletes the file 15030 via a file system 15070, for example. Since the actual size directory 15040 in which file 15030 was stored becomes empty, and since no more files having a file size of 3.2 MB is registered in the index directory 1250, the actual size directory 15040 is also deleted.

Figure 17:
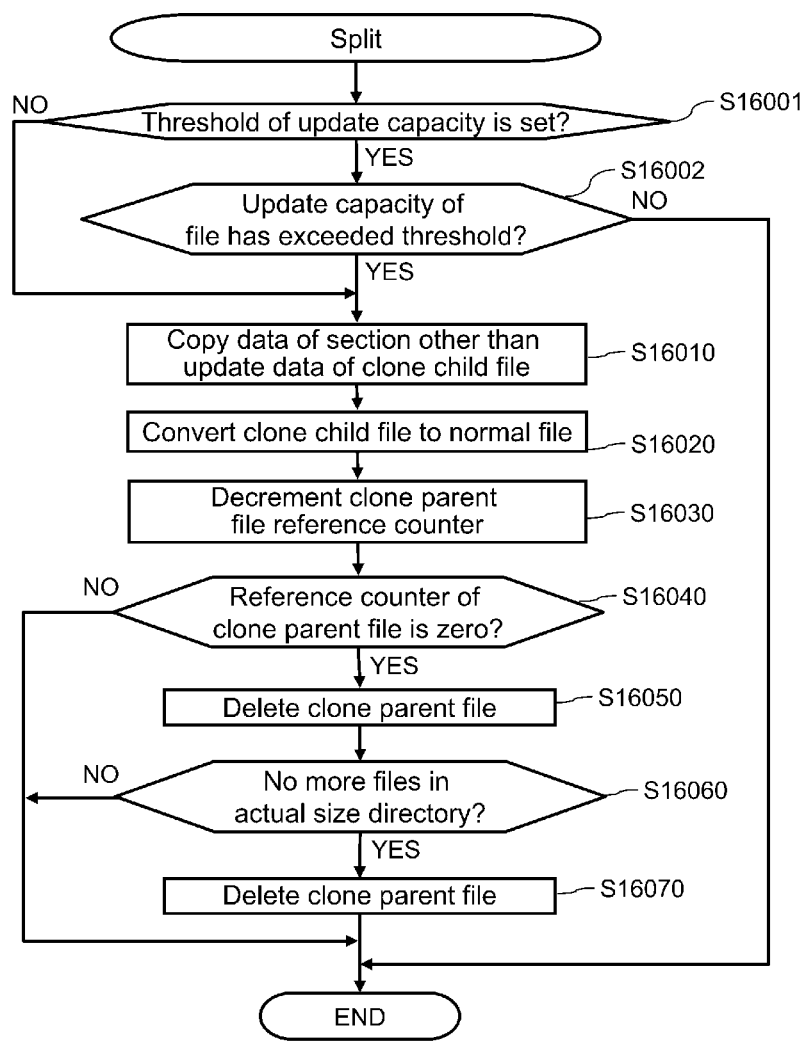
FIG. 17 is a flowchart illustrating a split processing according to the third embodiment of the present invention.

FIG. 17 illustrates a flowchart of split processing. The present processing is executed for example via a file system 15070. The system administrator issues a split command to the NAS device 1000 using a NAS manager 15200, and the NAS device 1000 having received the command notifies the file system 15070 to start the split processing, according to which the file system 15070 executes the processing illustrated in FIG. 17.

Further, since it is difficult for the system administrator to notice that the difference between a clone child file and a clone parent file has become significant, so that the de-termination can be performed by the file system 15070. A threshold of performing split processing when update data of the clone child file has reached a certain percentage of the whole data is designated optionally when issuing a split command If the optional designation of a threshold has not been performed, split processing is performed based on the determination of S16001 starting from the processing of S16010. When an option of the threshold is designated, in S16002, the system checks the update data capacity that the clone child file has, and if the result has not exceeded the threshold, the procedure advances to S16010 and split processing is performed. If the threshold has not been exceeded, split processing is not performed and the processing is ended.

Further, the split command supports file designation, directory designation and file system designation. In the case of directory designation, split processing is performed for all the files in the relevant directory, whereas in the case of file system designation, split processing is performed for all the files in the relevant file system.

In S16010, the sections other than the update data that the clone child file has, that is, the data of the area referring to the clone parent file is copied from the clone parent file to the clone child file. Thus, the clone child file will have all the data. In S16020, the inode information of the clone child file is changed and converted to a normal file. In S16030, the reference counter of the clone parent file that the clone child file converted to a normal file referred to is decremented (−1).

In S16040, if the reference counter of the clone parent file has become zero, the procedure advances to S16050, and if not, the present processing is ended. In S16050, the clone parent file is deleted. In S16060, if the number of files stored in the actual size directory 16040 in which the clone parent file has been stored becomes zero, the procedure advances to S16070, and if not, the present processing is ended. In S16070, the actual size directory is deleted and the present processing is ended.

As an effect of the present embodiment, the files are split when the difference between the clone parent file and the clone child file has becomes significant, so that the data of the clone parent file is prevented from becoming useless. A few of the preferred embodiments of the present invention has been illustrated, but these embodiments are mere examples for describing the present invention and the embodiments are not meant to limit the scope of the present invention in any way. Various other modifications are possible in realizing the present invention.

Lastly, it should be noted that the processes and techniques described in the present description are not related to any specific device in any way and can be implemented via a combination of appropriate components. Furthermore, various types of general purpose devices can be used according to the present description.

In addition, other implementations of the present invention will become apparent to those having ordinary knowledge in the present field of art based on the specification and embodiments of the present invention. The specification and specific examples illustrated here are merely typical examples, and various modified examples and/or components related to the illustrated embodiments can be adopted either independently or in combination in a computerized storage system having a data managing function.

REFERENCE SIGNS LIST

1000 NAS device
1100 NAS head
1122 Notify program
1123 Policy decision program
1124 Single instance program
1125 File system
1150 NAS storage system
1160 Storage controller
1180, 1181, 1182 NAS client
1240 Export directory
1250 Index directory

The invention claimed is:

1. A file storage system comprising:
a controller for managing a plurality of files each having management information and actual data;
a storage medium constituting a volume for storing the plurality of files, where the volume includes a first directory and a second directory, the first directory storing a first file and a second file;
wherein the controller:
creates a third file in a third directory and migrates the actual data of the second file to the third file;
sets up the management information of the second file to refer to the third file so that the third file is reference when the second file receives a read access from the computer;
compares a size of the actual data of the first file with a size of the actual data of the third file;
if, as a result of the size comparison, the data sizes are identical, compares a binary of the actual data of the first file with a binary of the actual data of the third file; and
if, as a result of the binary comparison, the binaries are identical, sets up the management information of the first file to refer to the third file so that the third file is referenced when the first file receives a read access from the computer, and deletes the first actual data,
wherein the second directory is an index directory,
wherein the third directory is provided in the second directory, the third file is created in the third directory in which the size of the third file is set as the directory name of the third directory, and
wherein in order to compare the size of the actual data of the first file with size of the actual data of the third file, the controller compares the size of the actual data of the first file with the size denoted in the third directory name instead of the size of the actual data of the third file.

2. A file storage system comprising:
a controller for managing a plurality of files each having management information and actual data;
a storage medium constituting a volume for storing the plurality of files, where the volume includes a first directory and a second directory, the first directory storing a first file and a second file, wherein the controller:
creates a third file in a third directory and migrates the actual data of the second file to the third file;
sets up the management information of the second file to refer to the third file so that the third file is referenced when the second file receives a read access from the computer;
compares a size of the actual data of the first file with a size of the actual data of the third file;
if, as a result of the size comparison, the data sizes are identical, compares a binary of the actual data of the first file with a binary of the actual data of the third file; and
if, as a result of the binary comparison, the binaries are identical, sets up the management information of the first file to refer to the third file so that the third file is referenced when the first file receives a read access from the computer, and deletes the first actual data,
wherein the third file is created in the third directory in which the size of the third file is set as the directory name of the third directory,
wherein upon receiving a write request to the first file after setting the management information of the first file to refer to the third file so that the third file is referenced when the first file receives a read access from the computer, the controller:
stores update data in the first file;
reads the actual data of the third file by referring to the third file when a read request to the first file that is not regarding the update data is received; and
reads the update data stored in the first file when a read request to the first file regarding the update data is received.

3. The file storage system according to claim 2, wherein upon migrating the actual data of the second file to the third file, the controller:
sets up the management information of the third file so that an actual data storage area of the second file is shown as a storage area storing the actual data of the third file; and
deletes the management information of the second file showing the actual data storage area of the second file.

4. The file storage system according to claim 1, wherein when the data sizes differ as a result of the size comparison, the controller:
creates a fourth directory in the second directory having the size of the first file set as the directory name of the fourth directory;
creates a fourth file in the fourth directory;
migrates the actual data of the first file to the fourth file; and
sets up the management information of the first file to refer to the fourth file so that the fourth file is referenced when the first file receives a read access from the computer.

5. The file storage system according to claim 1, wherein when the binaries differ as a result of the binary comparison, the controller:
creates a fourth file in the third directory;
migrates the actual data of the first file to the fourth file; and
sets up the management information of the first file to refer to the fourth file so that the fourth file is referenced when the first file receives a read access from the computer.

6. The file storage system according to claim 5, wherein during the binary comparison, the controller:
computes a hash value of the first file and the third file;
changes a name of the third file to contain the hash value of the third file; and
creates the fourth file to have a name including the hash value of the first file.

7. The file storage system according to claim 1, wherein when the data sizes are identical as a result of the size comparison, the controller:
checks whether a number of files stored in the third directory exceeds a threshold value;
if the number of files stored in the third directory exceeds the threshold value as a result of the check, compares hash values of the files stored in the third directory and the first file; and
performs binary comparison with the first file for the file having identical hash values with the first file as a result of the hash value comparison.

8. The file storage system according to claim 7, wherein the hash value comparison is performed by comparing the calculated hash value of the first file with the hash value contained in the file name stored in the third directory.

9. The file storage system according to claim 1, wherein the controller:
counts a reference number of the third file being referred to from the plurality of files stored in the first directory;
deletes the third file when the reference number of files referring to the third file becomes zero; and
deletes the third directory when there are no more files in the third directory as a result of deleting the third file.

10. The file storage system according to claim 2, wherein the controller:
observes a ratio of the update data stored in the first file with respect to the actual data stored in the third file; and
when the observed ratio exceeds a threshold value, copies portions excluding the update data of the actual data stored in the third file from the third file to the first file, and deletes the management information of the first file which refers to the third file.

11. The file storage system according to claim 2, wherein the size comparison of the files stored in the first directory is performed in order from the file having the largest data.

12. The file storage system according to claim 2, wherein the second directory is a hidden directory.

13. A single instantiation method of a file storage system, the file storage system comprising:
a controller for managing a plurality of files each having management information and actual data;
a storage medium constituting a volume for storing the plurality of files, where the volume includes a first directory and a second directory, the first directory storing a first file and a second file;
wherein the controller:
creates a third file in a third directory and migrates the actual data of the second file to the third file;
sets up the management information of the second file to refer to the third file so that the third file is referenced when the second file receives a read access from the computer;
compares a size of the actual data of the first file with a size of the actual data of the third file;
if, as a result of the size comparison, the data sizes are identical, compares a binary of the actual data of the first file with a binary of the actual data of the third file; and
if, as a result of the binary comparison, the binaries are identical, sets up the management information of the first file to refer to the third file so that the third file is referenced when the first file receives a read access from the computer, and deletes the first actual data,
wherein the second directory is an index directory, wherein the third directory is provided in the second directory, the third file is created in the third directory in which the size of the third file is set as the directory name of the third directory, and wherein in order to compare the size of the actual data of the first file with size of the actual data of the third file, the controller compares the size of the actual data of the first file with the size denoted in the third directory name instead of the size of the actual data of the third file.

* * * * *